(12) United States Patent
Fairweather et al.

(10) Patent No.: US 12,485,582 B2
(45) Date of Patent: Dec. 2, 2025

(54) LOW-DUST CUTTING DEVICE FOR MULTIPLE TILES AND LOW-DUST SCORING DEVICE FOR CONCRETE MASONRY UNITS

(71) Applicant: The Marketer's Engineering Tool Source LLC, Eagle River, AK (US)

(72) Inventors: Mitchell Fairweather, Pawnee, OK (US); John Borland, Eagle River, AK (US)

(*) Notice: Subject to any disclaimer, the term of this patent is extended or adjusted under 35 U.S.C. 154(b) by 458 days.

(21) Appl. No.: 17/752,563

(22) Filed: May 24, 2022

(65) Prior Publication Data

US 2022/0371223 A1    Nov. 24, 2022

Related U.S. Application Data

(60) Provisional application No. 63/192,256, filed on May 24, 2021.

(51) Int. Cl.
*B28D 1/22*      (2006.01)
*B28D 7/04*      (2006.01)

(52) U.S. Cl.
CPC ............. *B28D 1/225* (2013.01); *B28D 7/04* (2013.01)

(58) Field of Classification Search
CPC .......... B28D 1/225; B28D 1/22; B28D 1/222; B28D 1/223; B28D 1/226; B28D 1/228; B28D 1/32; B28D 1/322; B28D 1/327; B28D 7/04; B26D 1/04; C03B 33/10; C03B 33/03

USPC ........................................................ 125/23.02
See application file for complete search history.

(56) References Cited

U.S. PATENT DOCUMENTS

| | | | | |
|---|---|---|---|---|
| 4,378,782 A | * | 4/1983 | Richard | B28D 1/225 |
| | | | | 125/23.02 |
| 4,693,232 A | * | 9/1987 | Yasuga | B28D 1/225 |
| | | | | 125/23.02 |
| 6,148,810 A | * | 11/2000 | Hepworth | B28D 1/225 |
| | | | | 83/886 |
| 6,164,272 A | | 12/2000 | Fouy | |
| 6,808,686 B1 | | 10/2004 | Held | |
| 2005/0016518 A1 | | 1/2005 | Ishii | |
| 2014/0238376 A1 | | 8/2014 | Courtemanche et al. | |
| 2016/0052170 A1 | * | 2/2016 | Moog | B28D 1/225 |
| | | | | 125/23.02 |
| 2020/0148578 A1 | * | 5/2020 | Dumenil | C03B 33/033 |

* cited by examiner

*Primary Examiner* — Robert F Neibaur
(74) *Attorney, Agent, or Firm* — Peter McFadden

(57) ABSTRACT

The present invention relates to devices for cutting tile and scoring concrete masonry units. These devices may function without generating large amounts of dust, while still allowing high-throughput cutting and scoring. The present invention features devices for cutting tile that may allow for multiple tiles to be cut simultaneously, thus boosting efficiency. The present invention features devices for scoring concrete masonry units that may enable precision scoring of multiple faces of the CMU. After the CMU is scored by the device of the present invention, it may be easily split along the scoring plane by hitting the top of the CMU with a hammer.

20 Claims, 13 Drawing Sheets

LOW-DUST CUTTING DEVICE FOR MULTIPLE TILES AND LOW-DUST SCORING DEVICE FOR CONCRETE MASONRY UNITS

CROSS-REFERENCES TO RELATED APPLICATIONS

This application is a non-provisional and claims benefit of U.S. Provisional Application No. 63/192,256 filed May 24, 2021, the specification of which is incorporated herein in its entirety by reference.

BACKGROUND OF THE INVENTION

Field of the Invention

The present invention relates to mechanical cutting devices for tile. More specifically, the present invention relates to mechanical tile cutting devices for cutting multiple tiles simultaneously.

The present invention relates to mechanical scoring devices for concrete masonry units (CMU). More specifically, the present invention relates to CMU scoring devices to facilitate the splitting of CMU into shorter lengths.

Background Art

Tile is a robust building material which has been used since antiquity for the covering of surfaces such as floors, walls, and roofs. One advantage of tile is that it may be mass produced and installed in a periodic pattern with a majority of the tile requiring no customization or cutting. However, in many situations, at least some of the tiles used (for example, those around the perimeter of the design) must be cut prior to installation.

Tile may be cut using a circular electric saw or grinder, however this approach typically generates a significant amount of ceramic dust, which has the potential to cause health problems for workers who experience chronic exposure to the dust. Specialty "wet saws" generally have a rotating diamond blade and a pump to circulate water over the cutting area to reduce the amount of airborne dust.

Mechanical tile cutters allow for tile to be cut with low dust and low noise. These devices typically allow for a single tile to be scored, and then snapped along the score mark via actuation of a breaker foot which presses down on either side of the score mark. However, current designs of mechanical tile cutters do not allow for simultaneous cutting of multiple tiles. For example, current designs require the breaker foot to be sequentially positioned on each tile to be cut.

Concrete masonry units (CMU) such as "cinder blocks" are commonly used for the building of "block" walls. Because of their hollow cores, walls built from CMU may be easily reinforced with internal rebar and poured concrete to as to provide structural stability and strength. When only a portion of a CMU is needed, a whole CMU may be either cut or split to size.

Cutting CMU with an electric saw traditionally results in loud noise and the generation of large quantities of dust. Additionally, electric power is not always easily accessible at the building location.

As an alternative to cutting, CMU may be split using a chisel and masonry hammer. For example, opposing sides of a CMU may be sequentially scored via multiple chisel impacts on each side, such that when the end of the scored CMU is hit with the masonry hammer, the CMU is split along the score marks. The main downside to this method is that it is time consuming and requires precision measurement to score both sides of the CMU evenly.

BRIEF SUMMARY OF THE INVENTION

It is an objective of the present invention to provide systems, devices and methods that allow for cutting multiple tiles simultaneously, as specified in the independent claims. Embodiments of the invention are given in the dependent claims. Embodiments of the present invention can be freely combined with each other if they are not mutually exclusive.

The present invention is an improvement of a tool that has been in the industry for a very long time. The new tool will make it possible to score and cut multiple tiles at one time. The original tool has been a very useful and inexpensive tool for the industry but has never been redesigned to be able to make multiple cuts at the same time. However, the new design for this tool adds a very much needed feature, and still keep its light weight, cost effectiveness. By adding the feature of cutting multiple tiles at the same time, will give the end user the utmost in a very inexpensive tool that will increase production in the workplace.

One of the unique and inventive technical features of the present invention is a long breaker bar disposed along a cutting axis of a mechanical tile cutting device. Without wishing to limit the invention to any theory or mechanism, it is believed that the technical feature of the present invention advantageously provides for the breaker bar to press down on multiple tiles simultaneously so as to cut the multiple tiles along the cutting axis. None of the presently known prior references or work has the unique inventive technical feature of the present invention. Furthermore, the prior references teaches away from the present invention. For example, the current teaching is that multiple tiles should be scored and cut sequentially. Furthermore, the inventive technical features of the present invention contributed to a surprising result. For example, the long breaker bar may allow for application of a greater force along the cutting axis, such that more robust tiles such as porcelain tiles may be cut.

Additionally, it is an objective of the present invention to provide systems, devices and methods that allow for precision scoring of CMU, as specified in the independent claims. Embodiments of the invention are given in the dependent claims. Embodiments of the present invention can be freely combined with each other if they are not mutually exclusive.

The present invention provides a new and practical way to revolutionize the original way CMU were cut before the introduction of electric masonry saws. Originally, CMU were cut with hammers and chisels. This changed with the introduction of the saw, thus creating new problems of dust, water and noise. The present invention minimizes these problems and eliminates the need for power cords and water pumps, thereby removing the potential for electrical power problems (shorts, shocks, etc). The basic design of the present invention allows a user to score and break a CMU using only a couple of easy motions to accomplish the task.

The present invention eliminates many of the problems and safety issues related to saw use. It additionally provides the user a very portable unit that can be hand carried on the job and on scaffolding without the bulkiness of its counterpart. It requires no cords and no water, and does not cause significant safety issues, noise, or dust. Yet this tool still makes very clean and aesthetic cuts for CMU. This tool may not completely replace a saw for all uses, but for general and common cuts it gives the user a very handy and useful way to accomplish the task.

One of the unique and inventive technical features of the present invention is an opposing pair of scoring chisels, held in position by a pair of vertical supports. Without wishing to limit the invention to any theory or mechanism, it is believed that the technical feature of the present invention advantageously provides for the chisels to impact opposite faces of a CMU so as to precisely score the CMU for splitting. None of the presently known prior references or work has the unique inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWINGS

The features and advantages of the present invention will become apparent from a consideration of the following detailed description presented in connection with the accompanying drawings in which:

FIG. 24A shows a perspective view of the device. FIG. 24B shows a side view of the device illustrating how the breaker bar indexes with the vertical support. FIG. 24C shows a view focusing on the scoring wheel assembly.

FIG. 24D shows another perspective view with the breaker bar handle in a starting position before pressure is applied.

DETAILED DESCRIPTION OF THE INVENTION

Following is a list of elements corresponding to a particular element referred to herein:

100 Tile cutting device; Tile; 110 Device base; 112 Top surface; 114 Tile support mat; 116 Bottom surface; Feet; 120 Vertical support; 122 Cutting axis; Horizontal gap; Vertical gap; 128 Tile slot; 130 Scoring guide rail; 132 Scoring wheel assembly; 133 Scoring bearing; 134 Scoring wheel support; 136 Scoring wheel; Scoring tension spring; 138 Scoring handle; 140 Fulcrum ridge; 150 Breaker bar rail; 152 Breaker bar assembly; 153 Breaker bar bearings; 154 Breaker bar support; 155 Breaker bar hinge; 156 Breaker bar; 158 Breaker bar handle; Breaker bar impact platform; 162 Breaker bar hydraulic system; 164 Breaker bar contact surface; 166 Breaker bar alignment tab; 167 Breaker bar alignment slot; 168 Breaker bar contact area; Restraint bar assembly; Restraint bar hinge; 172 Restraint bar support; 173 Restraint bar; 174 Restraint bar handle; 176 Restraint bar contact surface; 177 Restraint bar contact area; 178 Restraint bar clamping mechanism; 179 Restraint bar clamping release; 180 Tile positioning guide; 182 Tile positioning guide support; Alignment laser; Transportation wheel; Transportation handle; 300 Scoring device; Concrete Masonry Unit (CMU); 310 Device base; 312 Top surface; 314 CMU support mat; 316 Bottom surface; Feet; 320 Base attachment rod; 322 Base attachment fastener; Base separation distance; 330 Vertical support; Horizontal reinforcement member; Scoring plane; Horizontal gap; Vertical gap; Scoring chamber; Shock absorber; 340 Scoring chisel; 342 Scoring blade; 344 Chisel positioning spring; 350 Impact platform; Impact driving system; Impact driving spring; Counterweight; Impact driving system release; 370 CMU positioning guide; 372 CMU positioning support; Alignment laser; Transportation wheel; Transportation handle.

Figure 1:
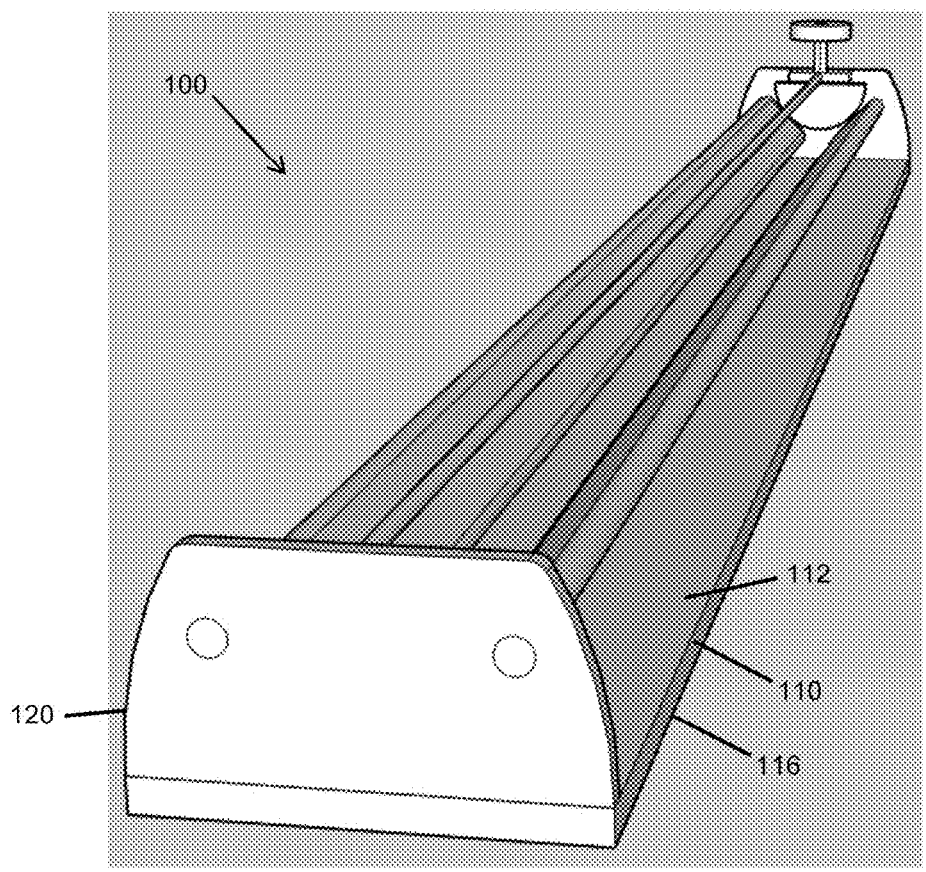
FIG. 1 shows an illustration of a tile cutting device of the present invention having two parallel rotating breaker bars.
Figure 2:
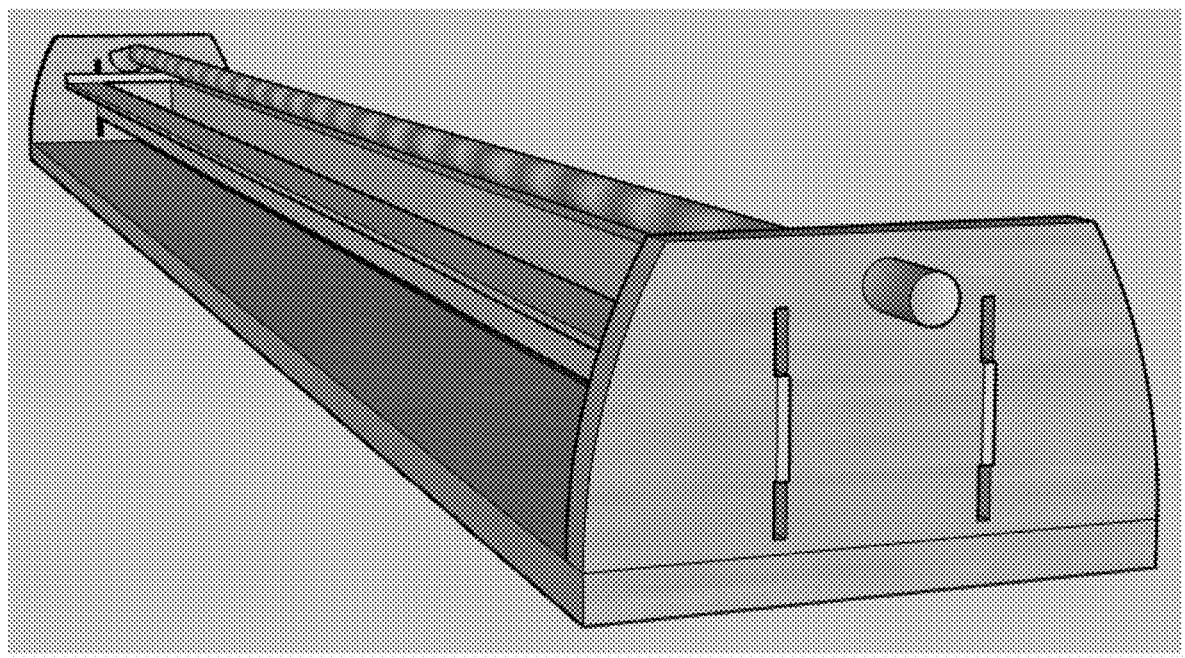
FIG. 2 shows an illustration of a tile cutting device of the present invention having two parallel breaker bars configured to move vertically as guided by breaker bar alignment slots and breaker bar alignment tabs.
Figure 3:
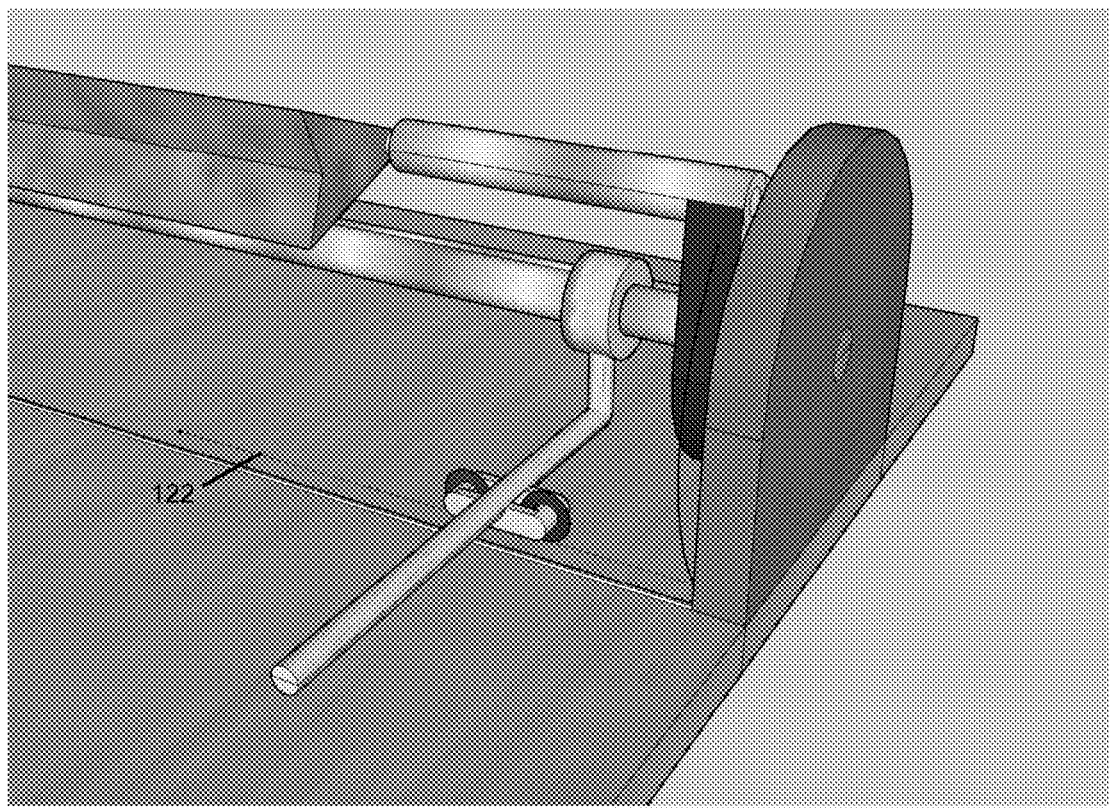
FIG. 3 shows an illustration of a tile cutting device of the present invention with a scoring wheel assembly having a pair of scoring wheels.
Figure 4:
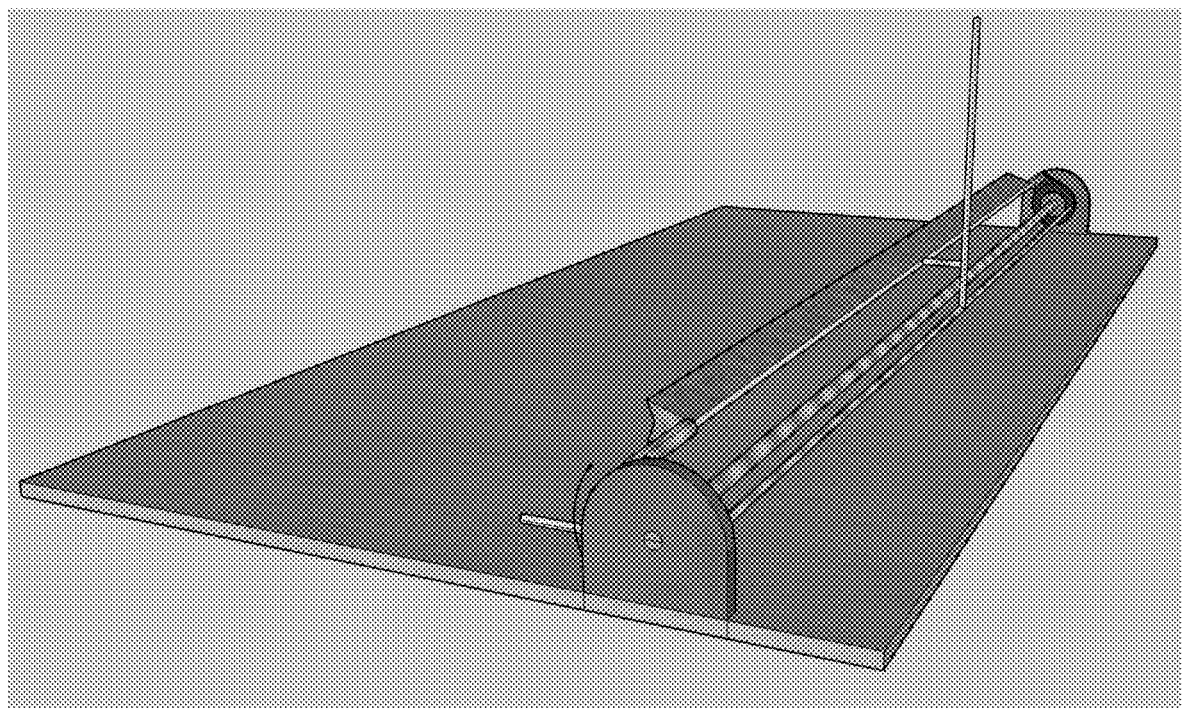
FIG. 4 shows an illustration of a tile cutting device of the present invention having a rotating breaker bar assembly.
Figure 5:
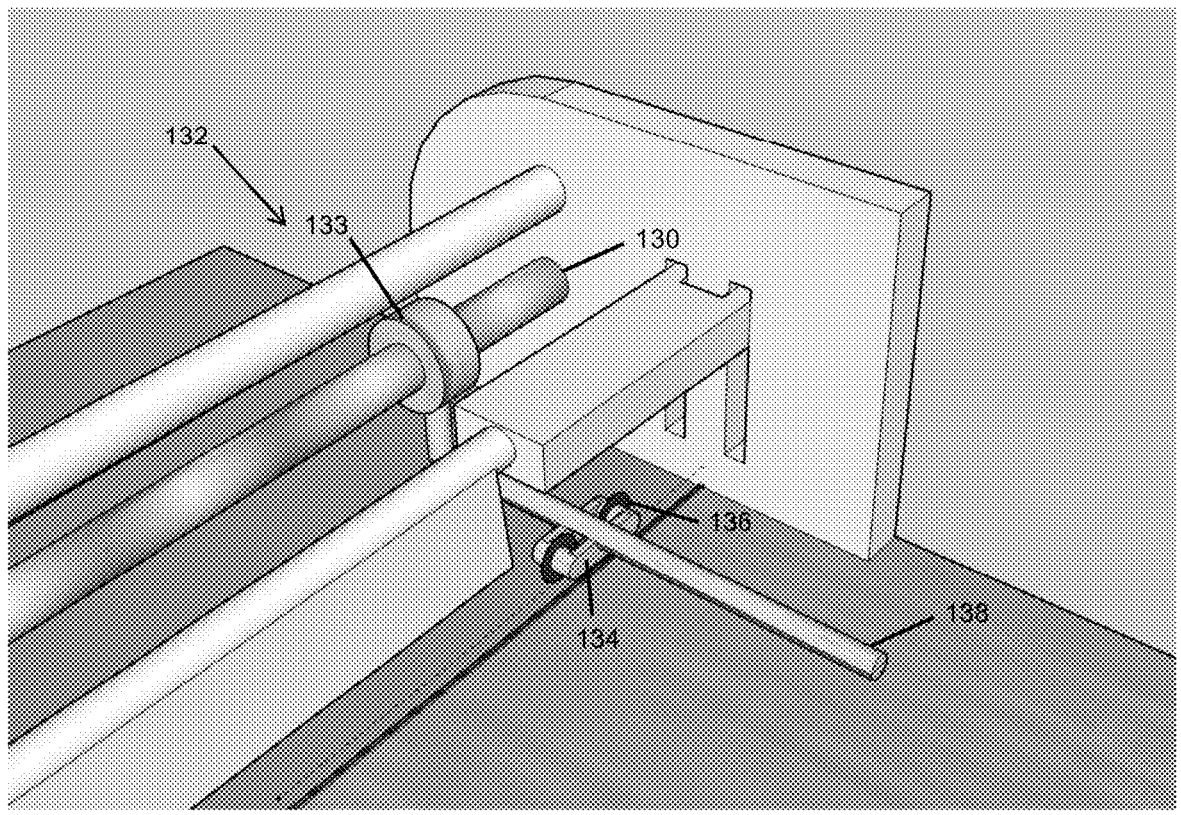
FIG. 5 shows an illustration of a tile cutting device of the present invention having a scoring guide rail, a breaker bar assembly, and an additional horizontal support rail.
Figure 6:
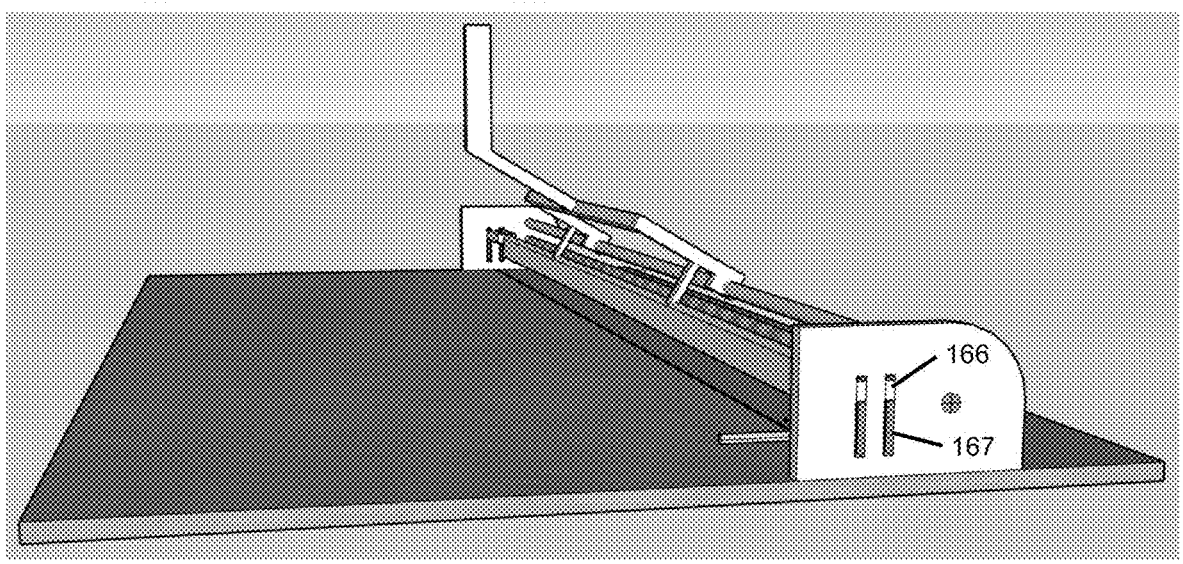
FIG. 6 shows another illustration of the tile cutting device of the present invention shown in FIG. 5.
Figure 7:
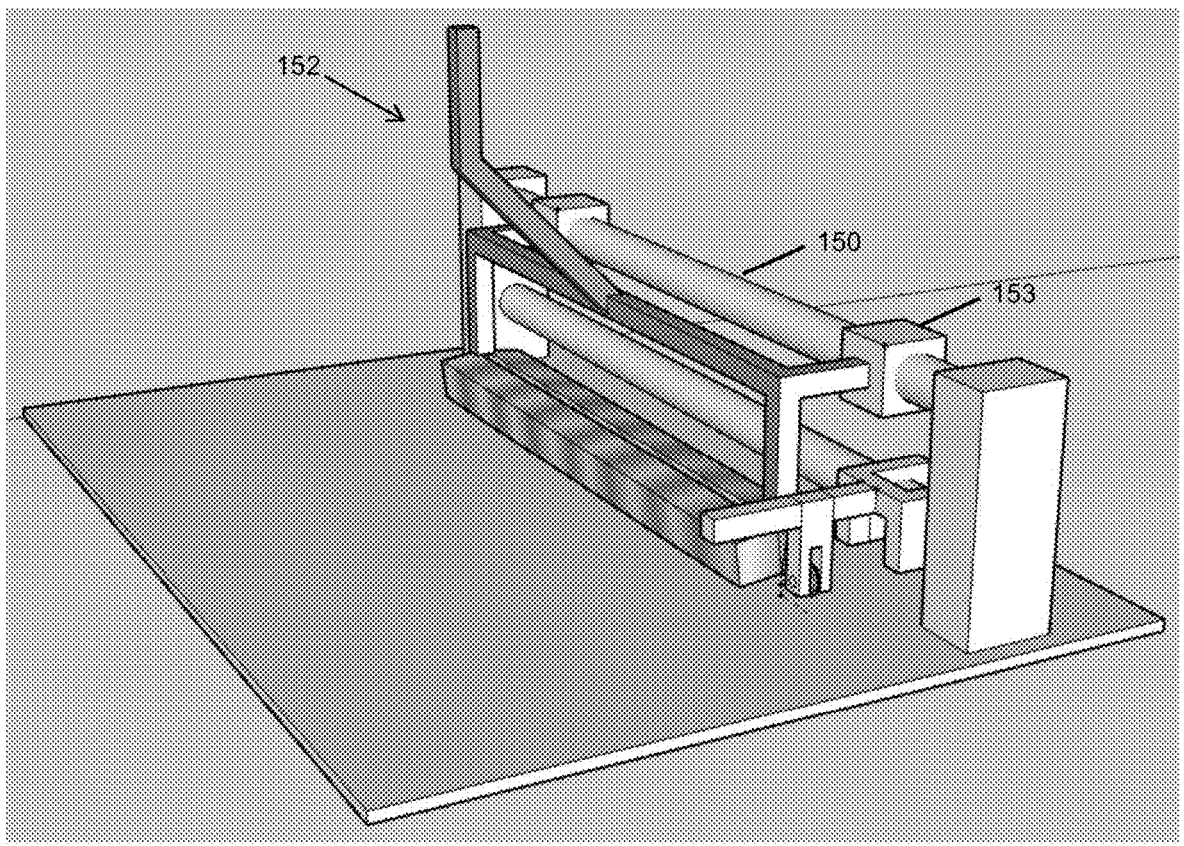
FIG. 7 shows an illustration of a tile cutting device of the present invention having a scoring guide rail and a breaker bar rail.
Figure 8:
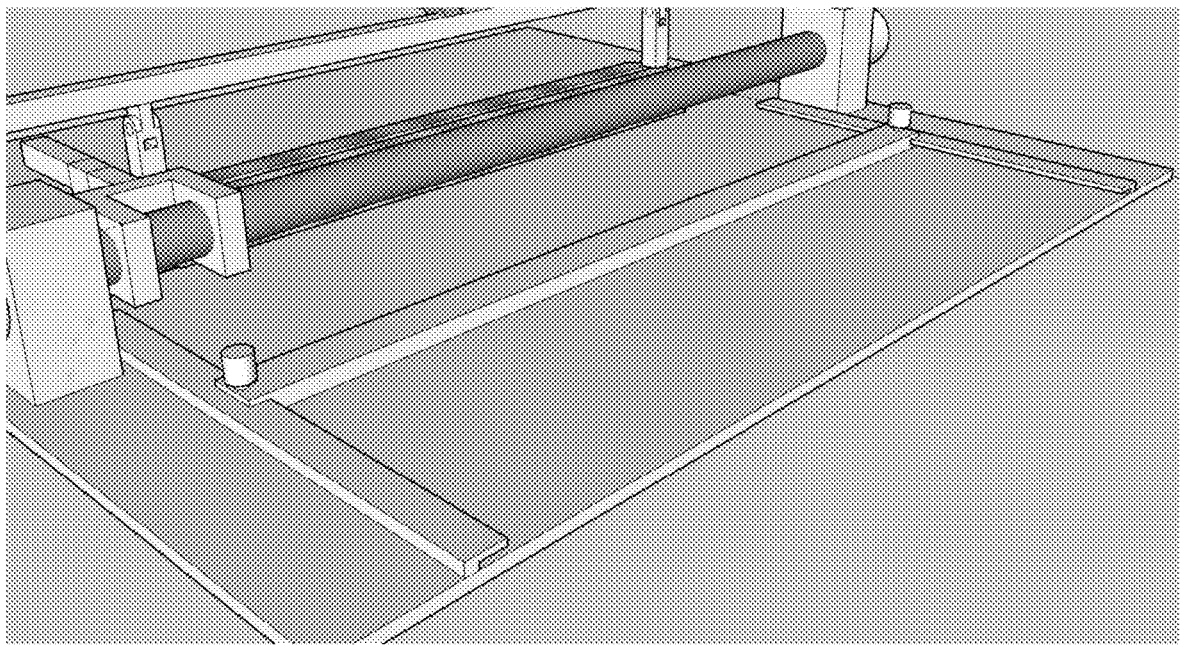
FIG. 8 shows an illustration of a tile cutting device of the present invention having a tile positioning guide.
Figure 9:
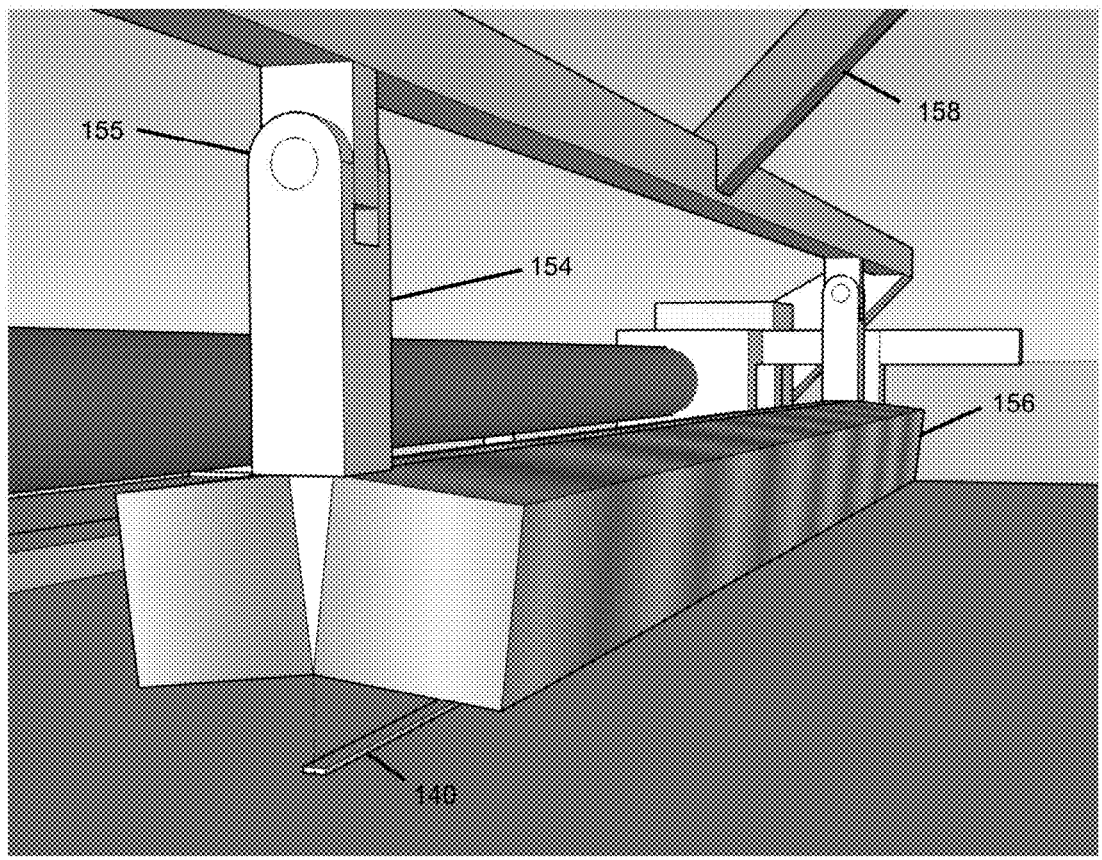
FIG. 9 shows an illustration of a tile cutting device of the present invention having a breaker bar assembly with breaker bar hinges, and a breaker bar with a concave breaker bar contact surface.
Figure 10:
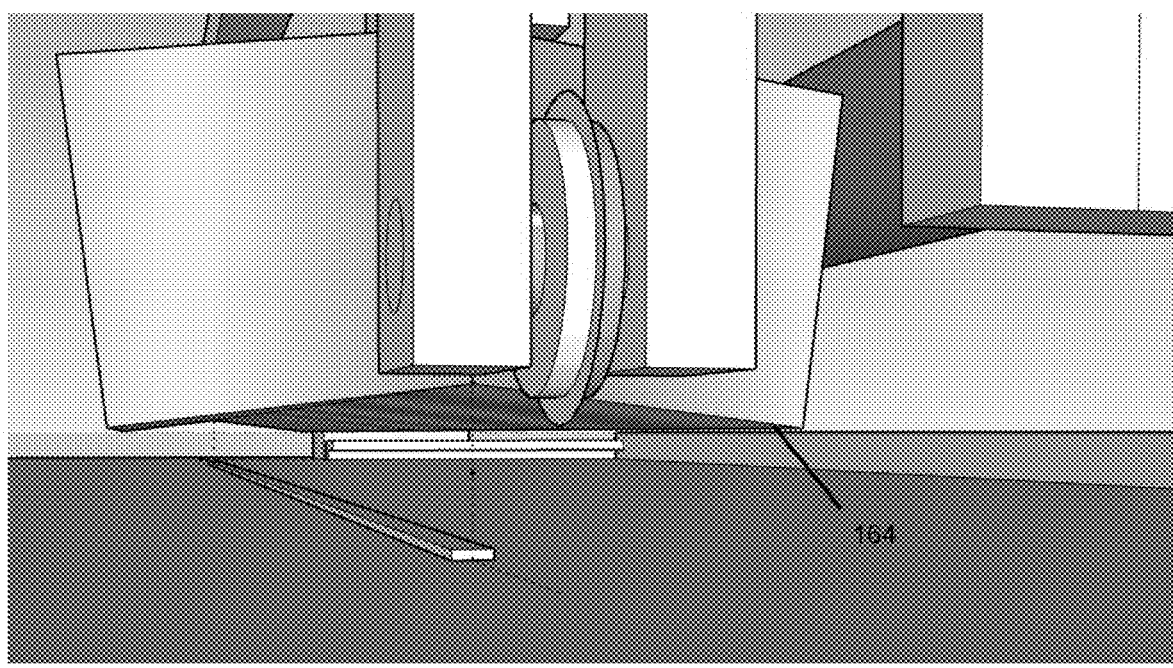
FIG. 10 shows an illustration of a tile cutting device of the present invention demonstrating the alignment of the scoring wheel and the breaker bar.
Figure 11:
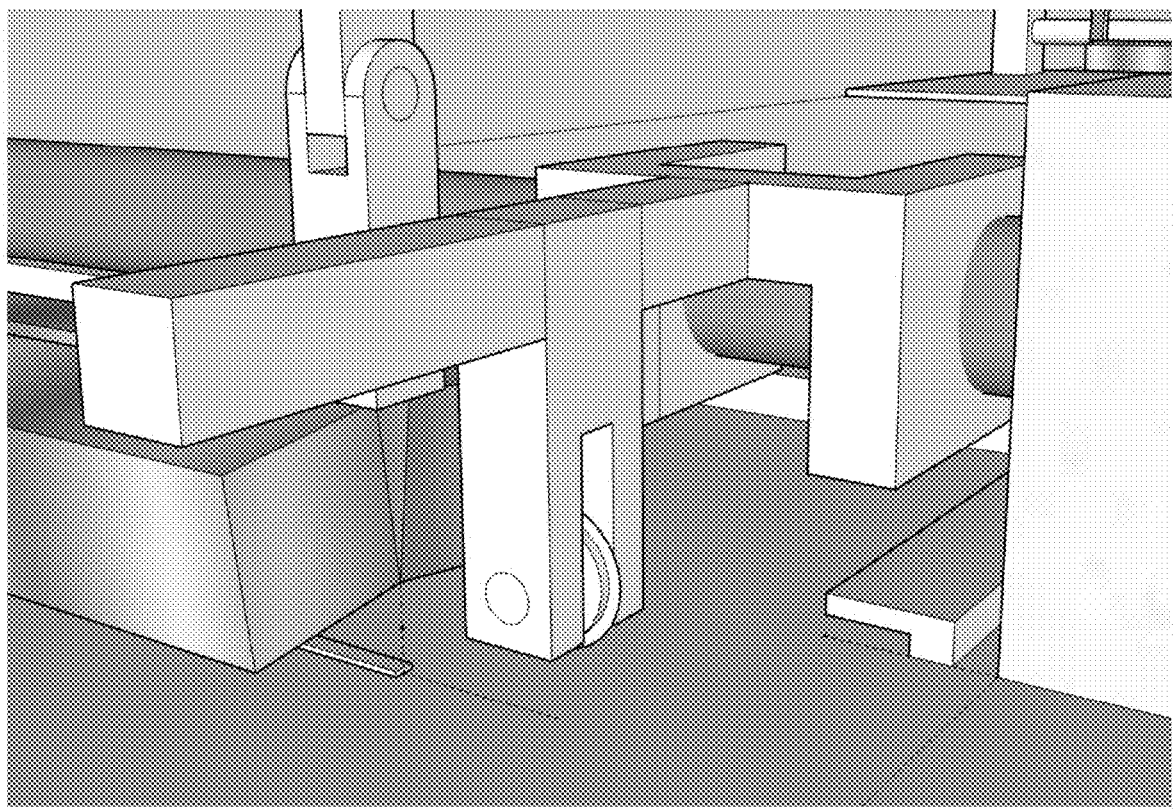
FIG. 11 shows an illustration of a tile cutting device of the present invention having a scoring wheel assembly with a single scoring wheel.
Figure 12:
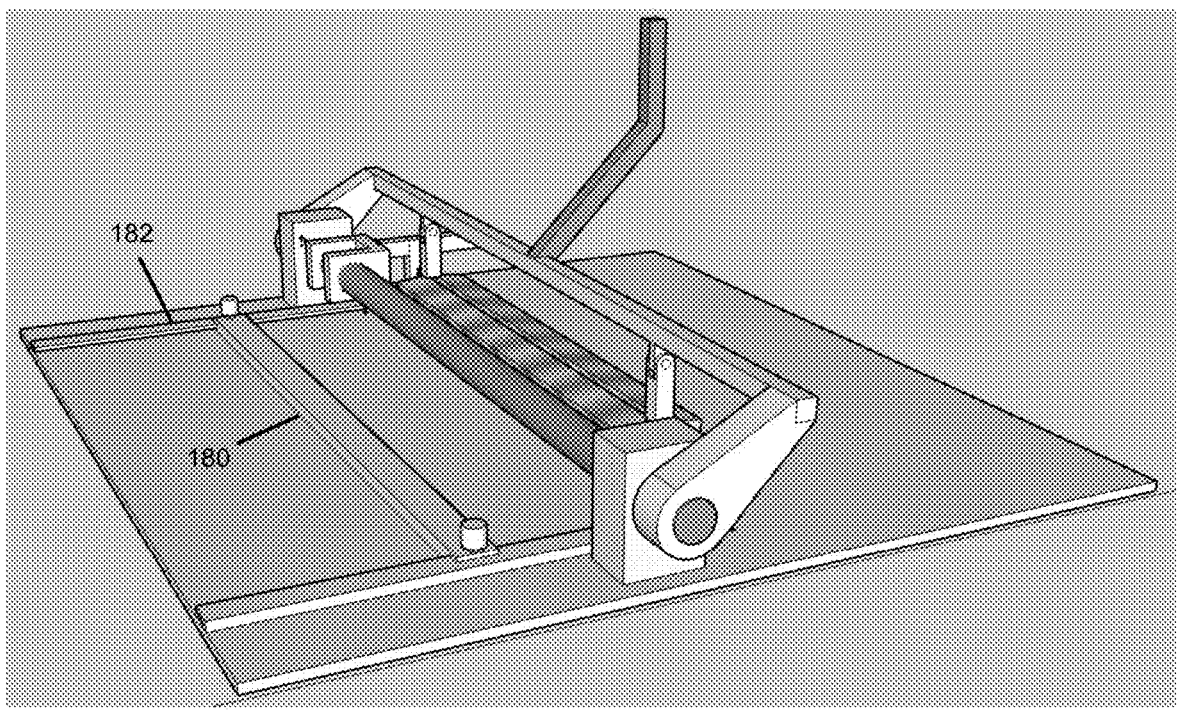
FIG. 12 shows an illustration of a tile cutting device of the present invention having a breaker bar assembly pivotably attached to the outside edges of a pair of vertical supports.
Figure 13:
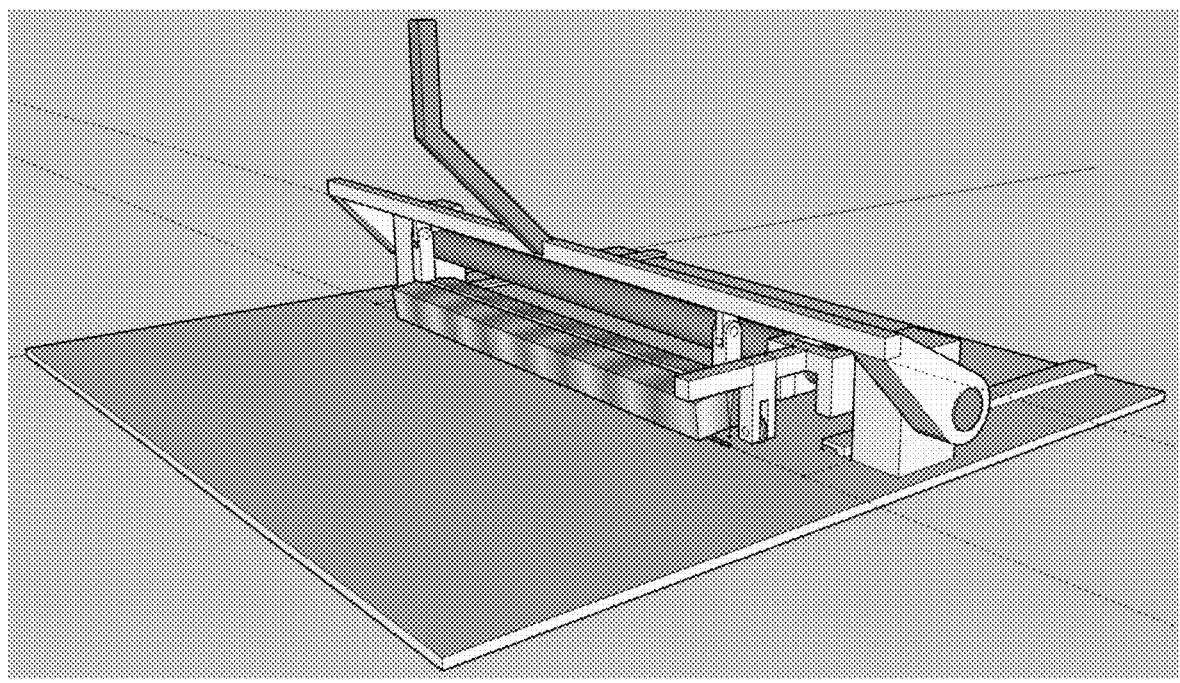
FIG. 13 shows another illustration of the tile cutting device of the present invention shown in FIG. 12.
Figure 14:
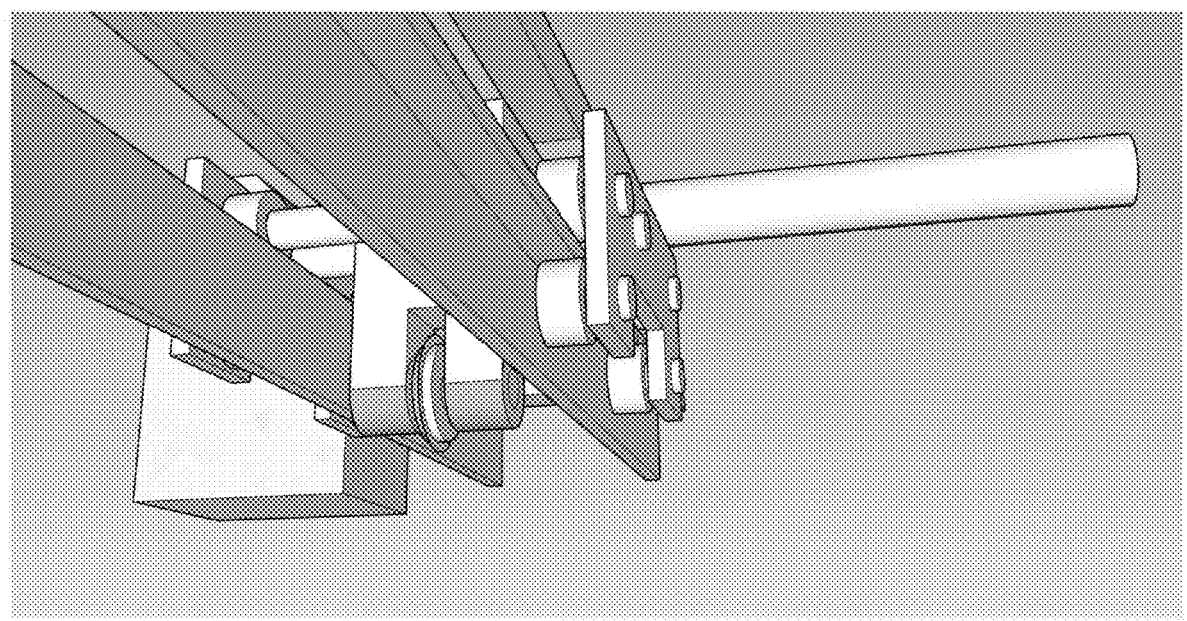
FIG. 14 shows an illustration of a tile cutting device of the present invention having a scoring wheel assembly that uses a pair of breaker bars as scoring guide rails such that the scoring wheel is centered between the breaker bars.
Figure 15:
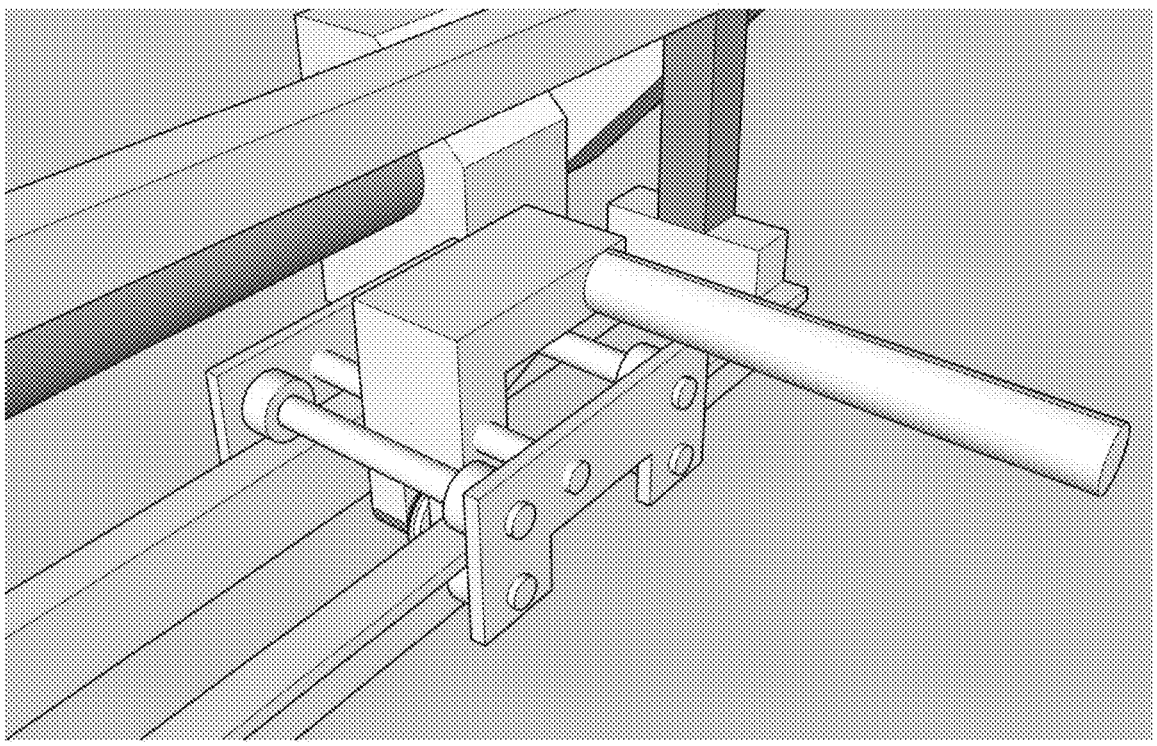
FIG. 15 shows another illustration of a tile cutting device of the present invention shown in FIG. 14.
Figure 16:
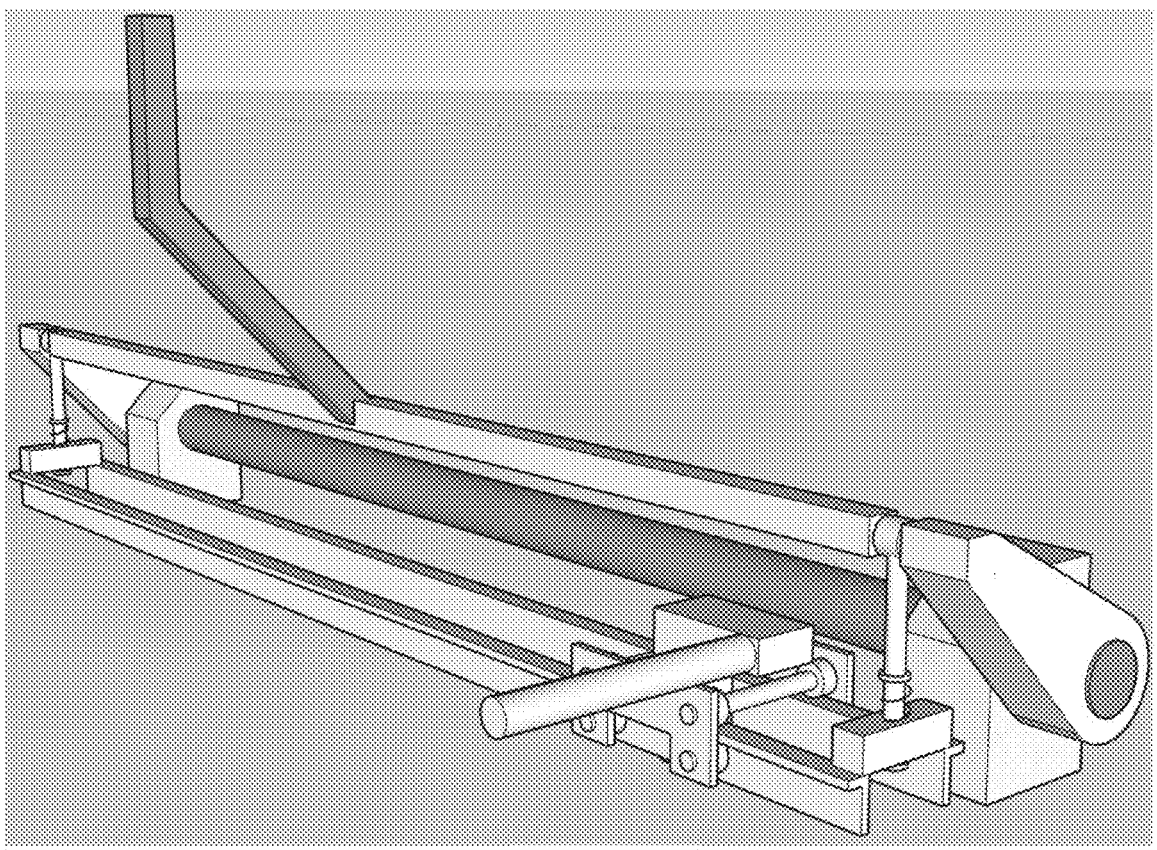
FIG. 16 shows still another illustration of a tile cutting device of the present invention shown in FIG. 14.
Figure 17:
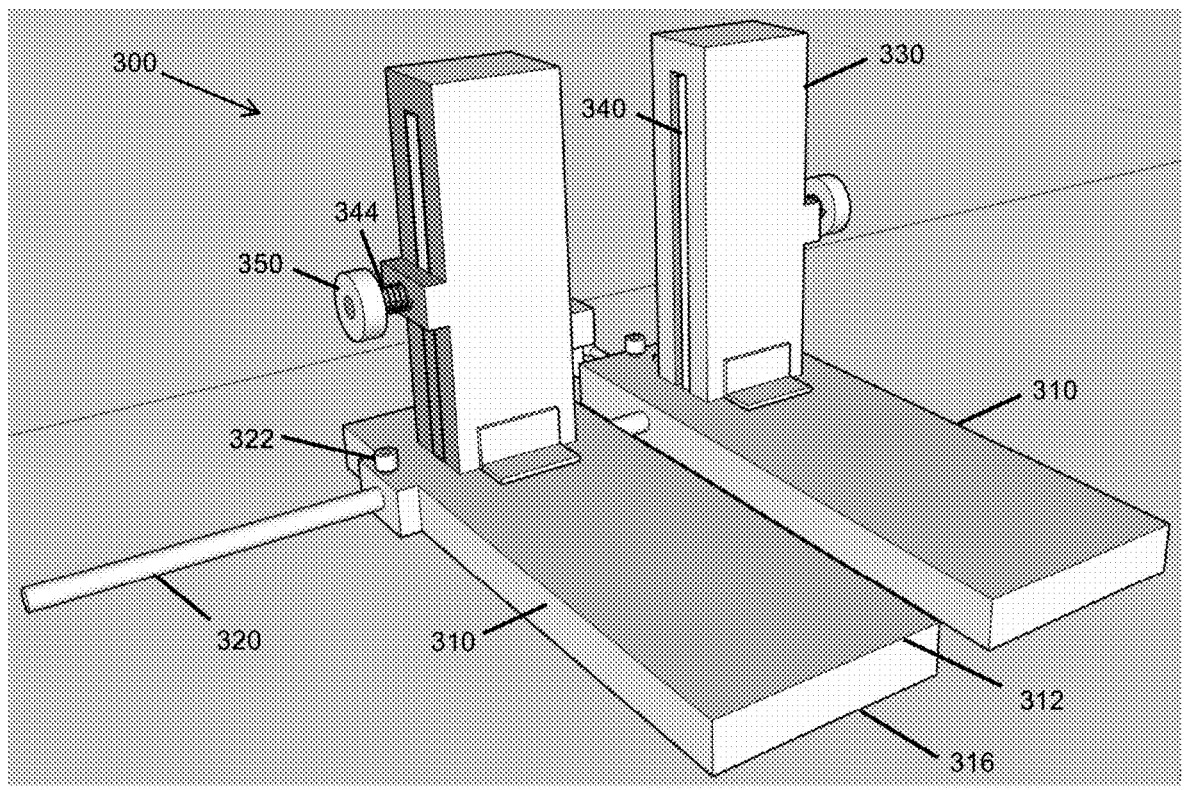
FIG. 17 shows an illustration of a concrete masonry unit scoring device of the present invention.
Figure 18:
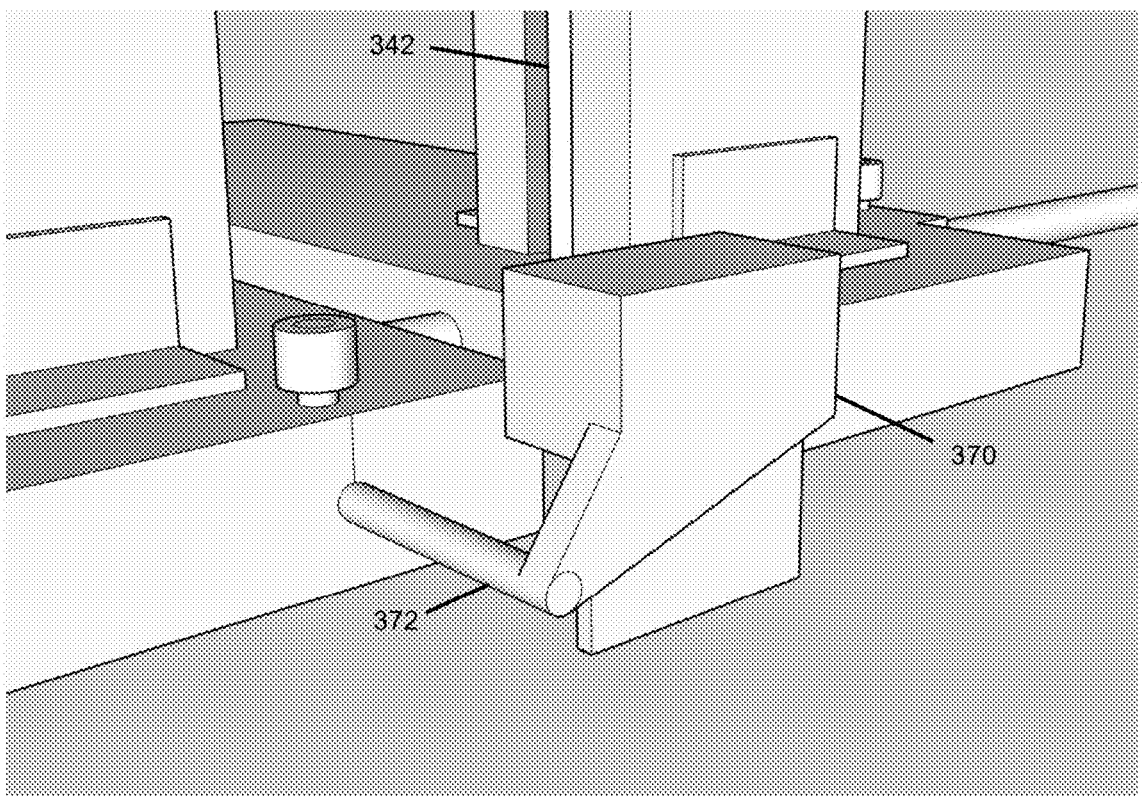
FIG. 18 shows an illustration of a concrete masonry unit scoring device of the present invention having an adjustable CMU positioning guide.
Figure 19:
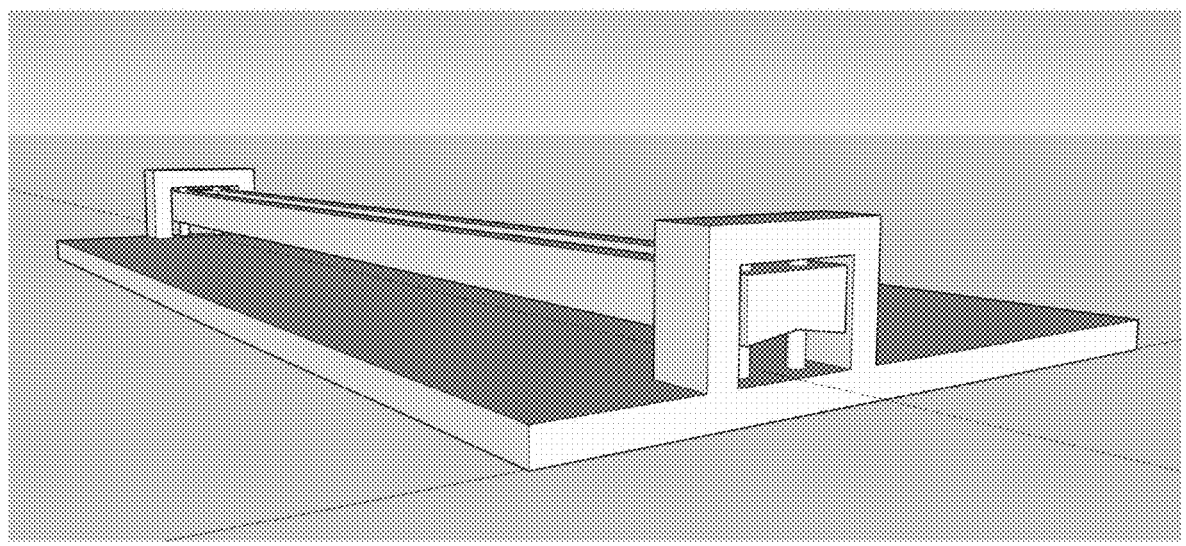
FIG. 19 shows an illustration of a tile cutting device of the present invention having a single breaker bar with a concave breaker bar contact surface and a scoring guide channel through the breaker bar.
Figure 20:
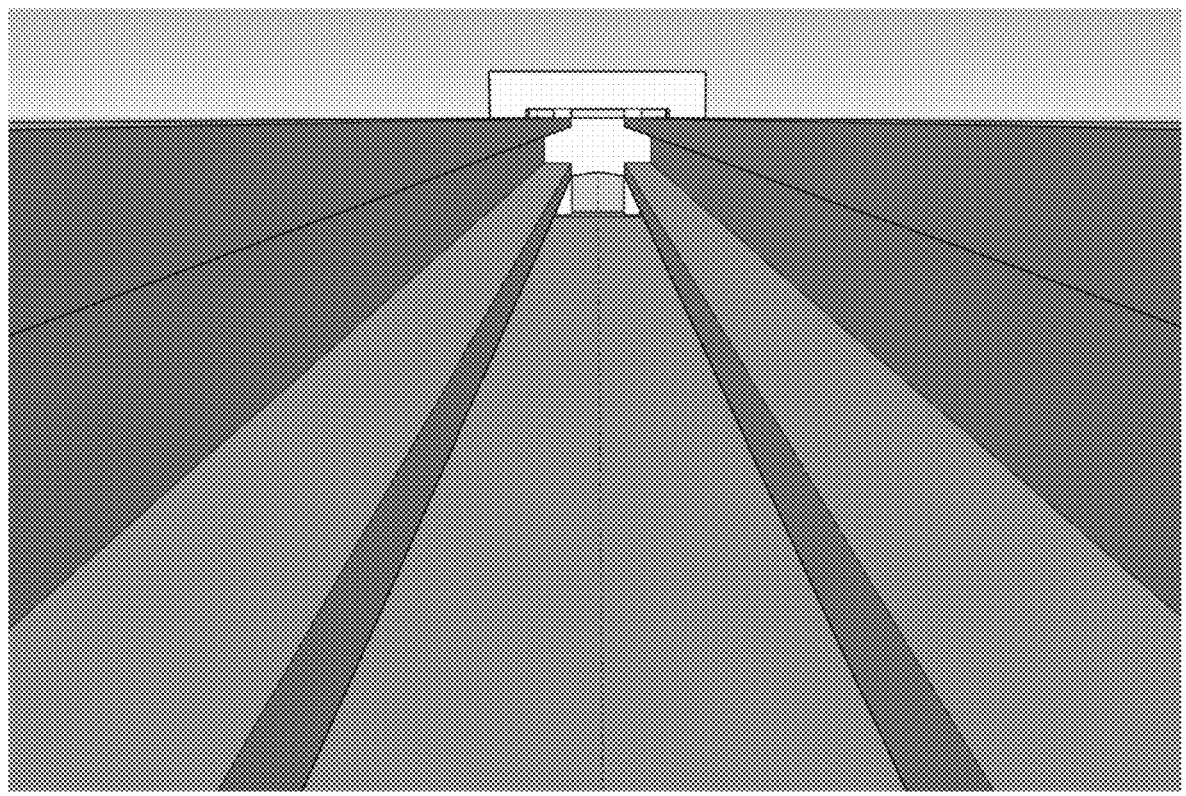
FIG. 20 shows another illustration of the tile cutting device shown in FIG. 19. This view shows horizontal scoring guide grooves within the interior sides of the breaker bar around the scoring guide channel. The scoring guide grooves may help to support and guide a scoring wheel assembly passing through the scoring guide channel.
Figure 21:
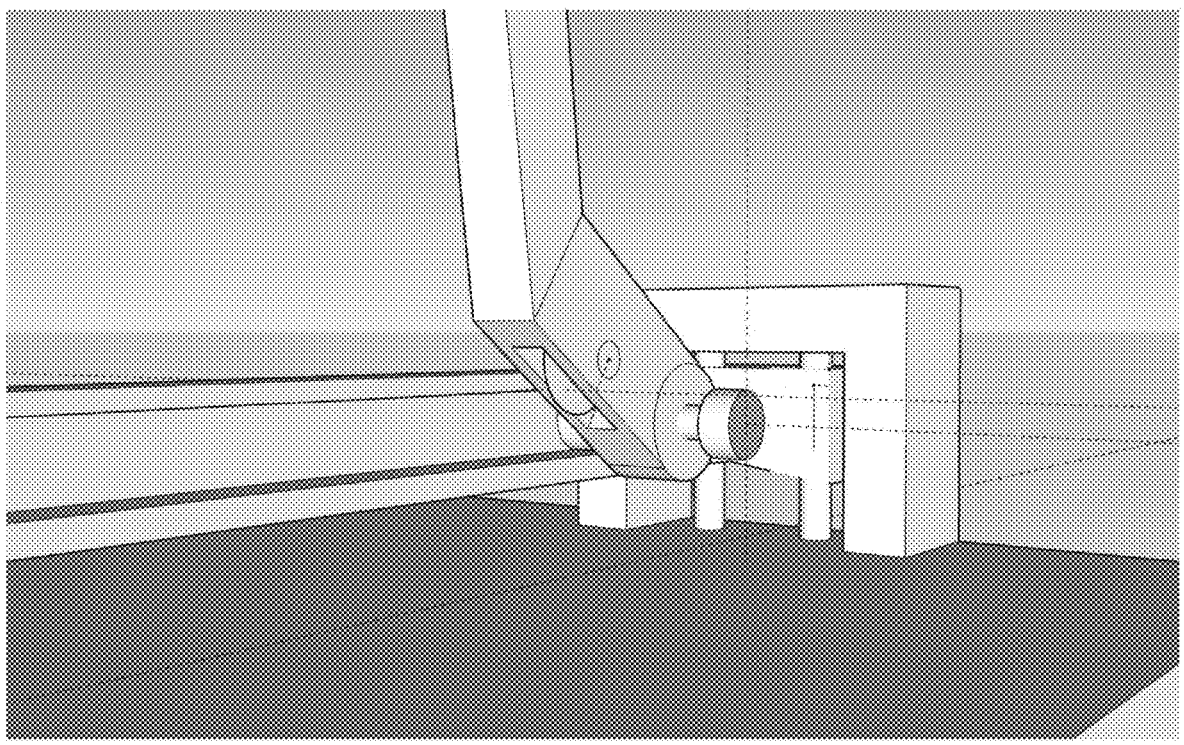
FIG. 21 shows another illustration of a tile cutting device shown in FIG. 19. This view has a portion of the breaker bar removed for better visualization of the scoring wheel assembly. The scoring wheel assembly may be pivoted about the two scoring bearings which fit within the scoring guide grooves. Furthermore, rotation of the two scoring bearings may allow for fluid movement of the scoring wheel assembly along the length of the scoring guide channel.
Figure 22:
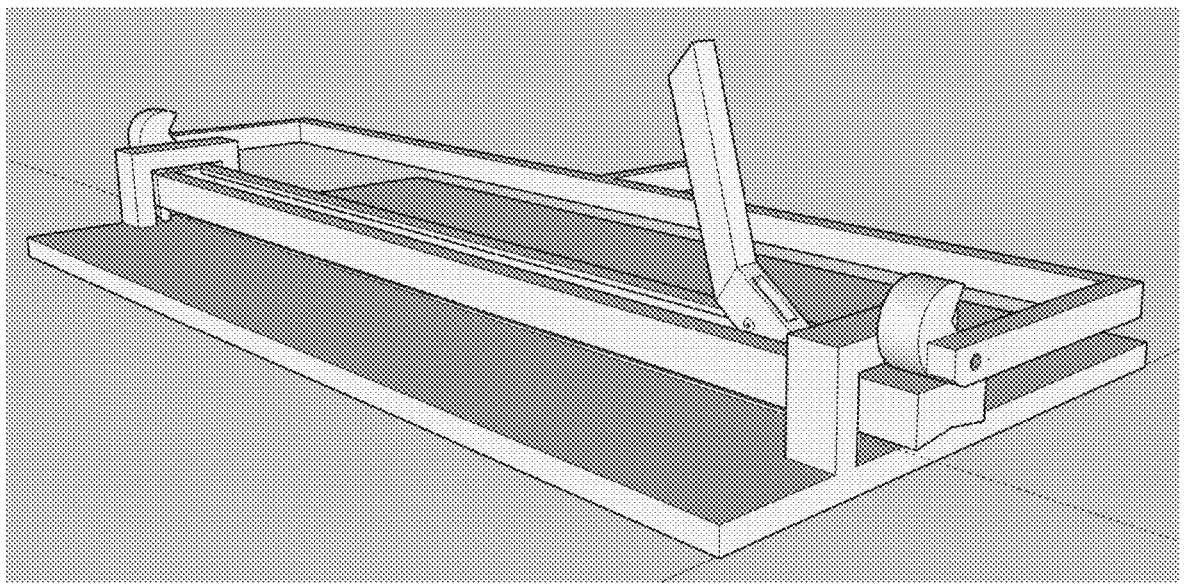
FIG. 22 shows another illustration of the tile cutting device shown in FIG. 19. This view shows the scoring wheel assembly and the entire breaker bar in place, as well as the entire breaker bar assembly including breaker bar cams to press down on the top of the breaker bar and a U-shaped breaker bar handle.
Figure 23:
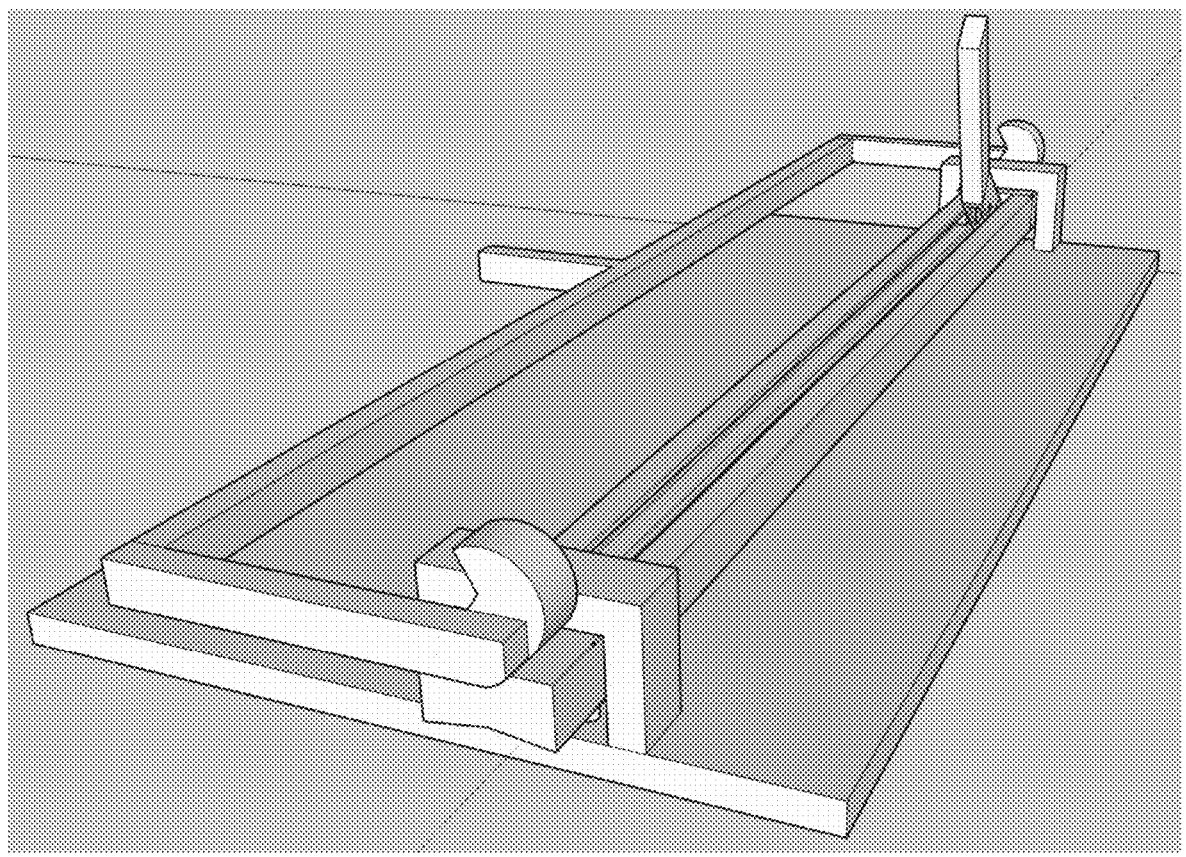
FIG. 23 shows still another illustration of the tile cutting device shown in FIG. 19.
Figure 24A:
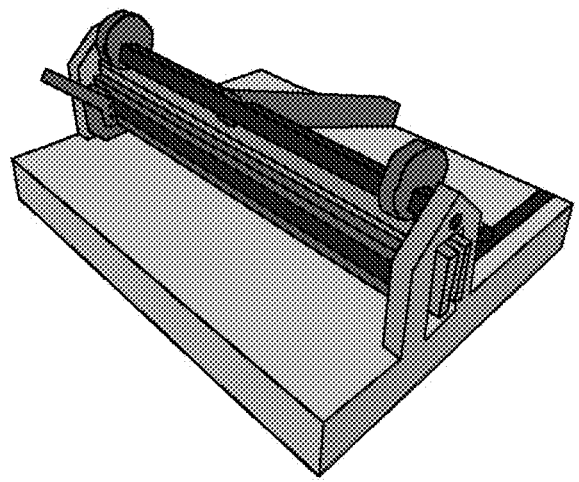
FIG. 24A-D show photographs of a tile cutting device of the present invention.
Figure 24B:
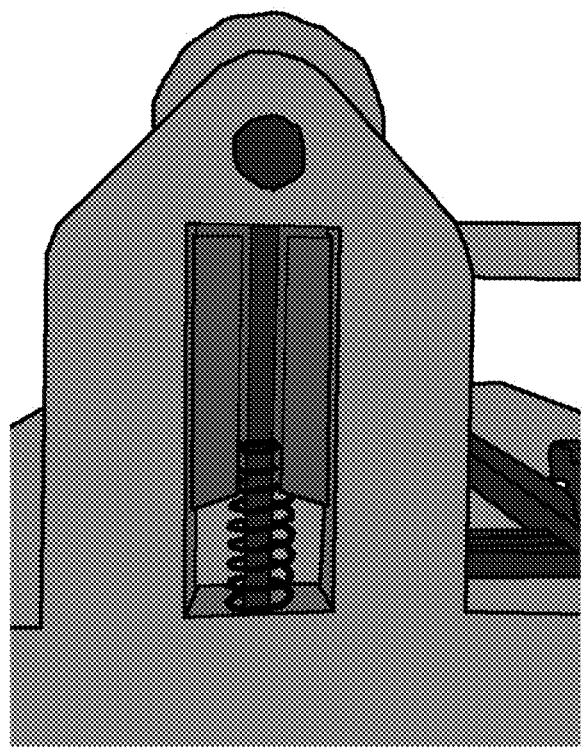
Figure 24C:
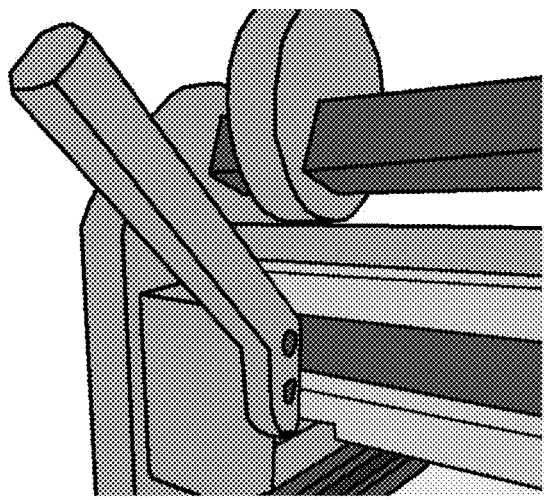
Figure 24D:
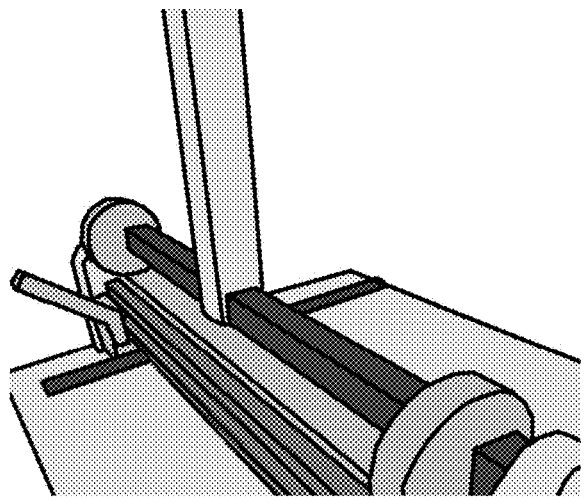

Referring now to FIGS. 1-16 and 19-24D, the present invention features a tile cutting device. In preferred embodiments, the tile cutting device is a low-dust device (100) for simultaneously cutting a plurality of tiles. The device (100) may include a device base (110), for example a rigid or semi-rigid device base. The device base may have a top surface (112) for supporting a plurality of tiles. In some embodiments, the device base may have a bottom surface (116) having a plurality of feet. The feet may be adjustable to allow for levelling of the device. Alternatively, the feet may be simple non-slip pads. In other embodiments, the bottom surface may have no feet. The device base (110) may comprise plastic, metal, or another suitable material.

The device (100) may include one or more tile support mats (114) disposed on the top surface (112) of the device base (110). These tile support mats (114) may be flexible or semi-flexible so as to provide cushioned support for the plurality of tiles. As a non-limiting example, the tile support mats (114) may comprise rubber, polyurethane, polyvinyl chloride, or another suitable material.

The device (100) may include a pair of vertical supports (120), extending vertically from the top surface (112) of the device base (110) with a horizontal gap between them. The length of the horizontal gap may determine a maximum cut length for the device. In preferred embodiments, length of the horizontal gap is selected such that multiple tiles may be fit within the horizontal gap simultaneously. As non-limiting examples, the length of the horizontal gap may be greater than 6, 8, 10, 12, 14, 16, 18, 20, 22, 24, 26, 28, 30, 32, 34, 36, 40, 44, 48, 52, 56, or 60 inches.

The device (100) may include a scoring guide rail (130) supported by the pair of vertical supports (120). The scoring guide rail (130) may be directly attached to the pair of vertical supports (120) or may be attached via a plurality of attachment members. The scoring guide rail (130) may be positioned between the vertical supports (120). Alternatively, the scoring guide rail (130) may be offset from the vertical supports (120) such that it is parallel with an axis passing through the vertical supports (120). The device (100) may have a vertical gap between the top surface (112) of the device base (110) and the scoring guide rail (130) such that the vertical gap and the horizontal gap form a tile slot (128). In preferred embodiments, the scoring guide rail (130) is parallel to the top surface (112) of the device base (110). The scoring guide rail may have a round, oval, square, rectangular, irregular, or other suitable cross-section. In some embodiments, the device (100) may include two parallel scoring guide rails (130). In some embodiments, the scoring guide rail (130) may be stationary. In other embodiments, the scoring guide rail (130) may be movable. As a non-limiting example, the scoring guide rail (130) may be configured to move up and down so as to vary the vertical gap between the top surface (112) of the device base (110) and the scoring guide rail (130). The scoring guide rail (130) may serve only to support a movable scoring wheel assembly (132), or may be integrated with other components of the device (100). As a non-limiting example, one or more breaker bars (156) may function as scoring guide rails (130).

In preferred embodiments, the device (100) includes a movable scoring wheel assembly (132). The scoring wheel assembly (132) may include one or more scoring bearings (133), configured to movably attach the scoring wheel assembly (132) with the scoring guide rails (130). As a non-limiting example, the scoring bearing (133) may be disposed around or partially around the scoring guide rail (130) such that it may move along the scoring guide rail (130). The scoring wheel assembly (132) may include one or more scoring wheel supports (134), extending from the scoring bearing (133) so as to support one or more scoring wheels (136). The one or more scoring wheels (136) may be attached to the scoring wheel support (134) such that it or they are configured to score the plurality of tiles along a cutting axis (122) as the scoring bearing (133) is moved along the scoring guide rail (130). If multiple scoring wheels (136) are used, they may be spaced along the same cutting axis such that scoring may be accomplished along a distance along the cutting axis by only moving the scoring wheel assembly (132) a fraction of that distance. For example, if five evenly spaced scoring wheels (136) are used, the scoring wheel assembly (132) may only need so move twenty percent of the entire distance to be scored. The scoring wheel assembly (132) may include a scoring tension spring. As a non-limiting example, the scoring tension spring may be configured to retract the scoring wheel (136) when not in use. Additionally, the scoring tension spring may serve to properly calibrate a scoring pressure of the scoring wheel (136) on the plurality of tiles. The scoring wheel assembly (132) may include a scoring handle (138) attached to the scoring wheel support (134) so as to allow for actuation of the scoring wheel assembly (132). In some embodiments, the scoring handle (138) may be round or generally cylindrical in shape, and may extend from the scoring wheel support (134) along a vertical axis, or along an axis parallel or perpendicular to the cutting axis (122).

The device (100) may include a fulcrum ridge (140), disposed on the top surface (112) of the device base (110) such that it is parallel with the cutting axis (122). The fulcrum ridge (140) may be formed by a narrow protrusion from the top surface (112) of the device base (110). Alternatively, the fulcrum ridge (140) may be formed by a height difference between two regions of the top surface (112) of the device base (110). The height of the fulcrum ridge (140), as measured between the top of the fulcrum ridge (140) and the lowest adjacent top surface (112) of the device base (110), may be greater than about $1/64$, $1/32$, $1/16$, $1/8$, $1/4$, $3/8$, $1/2$, $5/8$, $3/4$, or $7/8$ of an inch. In preferred embodiments, the fulcrum ridge (140) is at least as long as the horizontal gap. The fulcrum ridge (140) may be centered between the vertical supports (120), or may be offset from the center of the vertical supports (120) by an offset distance. The cross-sectional profile of the fulcrum ridge (140) may be square, rectangular, or rounded such that the fulcrum ridge (140) presents either a sharp or rounded edge which is configured to act as a fulcrum for providing leverage on the plurality of tiles.

The device (100) may also include a breaker bar rail (150). The breaker bar rail (150) may be supported by the pair of vertical supports (120) such that it is parallel to the top surface (122) of the device base (110). The breaker bar rail (150) may be used to support a breaker bar assembly (152). Alternatively, the breaker bar assembly (152) may be supported by the scoring guide rail (130) or directly by the vertical supports (120).

The breaker bar assembly (152) may include one or more breaker bar bearings (153) configured to allow for rotation of the breaker bar assembly (152) about an axis parallel to the cutting axis (122). In alternative embodiments, the breaker bar assembly (152) may move vertically without any rotational movement. The breaker bar bearings (153) may be disposed around or partially around the breaker bar rail (150) so as to rotate around the breaker bar rail (150). The breaker bar assembly (152) may include one or more breaker bar supports (154) extending from the one or more breaker bar bearings (153) so as to support a breaker bar (156). The breaker bar supports (154) may additionally include one or more breaker bar hinges (155). As a non-limiting example, the breaker bar hinges (155) may function to allow a breaker bar contact surface (164) to remain parallel with the top surface (112) of the device base (110) while the breaker bar assembly (152) is rotated.

The breaker bar assembly (152) may include one or more breaker bars (156) attached the one or more breaker bar supports (154) such that each is parallel with the cutting axis (122). The breaker bar (156) may have a breaker bar contact surface (164) configured to simultaneously contact the plurality of tiles (101) along a breaker bar contact area (168). The breaker bar contact surface (164) may be flexible, semi-flexible, or rigid. As a non-limiting example, the breaker bar contact surface (164) may be a rubberized coating over a rigid metal substrate. The breaker bar (156) may be dimensioned and oriented such that the longest dimension of the breaker bar contact surface (164) is parallel with the cutting axis (122). For example, the breaker bar contact surface (164) may be rectangular with the long sides of the rectangle are parallel with the cutting axis (122) Without wishing to limit the present invention to any particular theory or mechanism, it is believed that this shape and orientation advantageously allows for the breaker bar contact surface (164) to simultaneously contact the plurality of tiles, such that the plurality of tiles may be cut simultaneously by a single actuation of the breaker bar assembly (152). In some embodiments, the breaker bar contact surface (164) may be flat, concave, or convex.

In selected embodiments, the one or more breaker bars (156) may additionally function as one or more scoring guide rails (130). In embodiments with multiple breaker bars (156), the breaker bars (156) may be configured to operate separately or in unison. As a non-limiting example, two breaker bars (156) may be actuated by a single movement which first causes one of the breaker bars (156) to contact the plurality of tiles along a first breaker bar contact surface (164) parallel with the cutting axis (122), and then second causes the second breaker bar (156) to contact the plurality of tiles along a second breaker bar contact surface (164) parallel with the cutting axis (122), and offset from the first breaker bar contact surface (164). In such embodiments, the plurality of tiles may be scored prior to contact of the plurality of tiles with either of the breaker bars (156), after contact with one of the two breaker bars (156) and before contact with the other breaker bar (156), or after contact with both breaker bars (156) but before a tile-breaking pressure is applied to the breaker bars (156). Thus, one or both of the breaker bars (156) may function as a restraint bar.

The breaker bar assembly (152) may include a breaker bar handle (158) attached to the breaker bar (156) so as to allow for actuation of the breaker bar assembly (152). In some embodiments, the breaker bar handle (158) may be round or generally cylindrical in shape, and may extend from the breaker bar (156) along a vertical axis, or along an axis parallel or perpendicular to the cutting axis (122). The breaker bar assembly (152) may additionally include a breaker bar impact platform disposed on the breaker bar (156) so as to allow for forceful actuation of the breaker bar assembly (152) via impact to the breaker bar impact platform. As a non-limiting example, striking the breaker bar impact platform with a hammer may provide the force necessary to simultaneously cut the plurality of tiles. In alternative embodiments, actuation of the breaker bar assembly (152) may be accomplished by means of a spring-loaded system or by a hydraulic system. In some embodiments, the breaker bar assembly (152) may include a plurality of breaker bar alignment tabs (166) extending from opposite ends of the breaker bar (156) so as to index with breaker bar alignment slots (167) in the pair of vertical supports (120). In other embodiments, a plurality of breaker bar alignment tabs (166) may extend from the pair of vertical supports (120) so as to index with breaker bar alignment slots (167) in the breaker bar (156) In preferred embodiments, the tabs (166) and slots (167) may guide precision actuation of the breaker bar assembly (152), such that the breaker bar (156) remains perfectly parallel with the cutting axis (122).

The device (100) may also include a restraint bar assembly for holding the plurality of tiles in place while they are scored and cut. The restraint bar assembly may include a pair of restraint bar hinges attached to the pair of vertical supports (120) or to the top surface (112) of the device base (110), so as to allow for actuation of the restraint bar assembly about an axis parallel with the cutting axis (122). Alternatively, the restraint bar assembly may include a single restraint bar hinge which allows for actuation of the restraint bar assembly about an axis perpendicular with the cutting axis (122). The restraint bar assembly may include one or more (e.g. a pair) of restraint bar supports (172) extending from the one or more of restraint bar hinges. The restraint bar assembly may include a restraint bar (173) attached to the one or more restraint bar supports (172) such that it may be positioned parallel with the cutting axis (122). In preferred embodiments, the restraint bar (173) has a restraint bar contact surface (176) configured to simultaneously contact the plurality of tiles along a restraint bar contact area (177). In further preferred embodiments, the restraint bar contact area (177) may have its longest dimension parallel with the cutting axis (122). The restraint bar assembly may include a restraint bar handle (174) attached to the restraint bar (173) so as to allow for actuation of the restraint bar assembly (152). In some embodiments, a single handle may function as both the restraint bar handle (174) and the breaker bar handle (158). The restraint bar assembly may include a restraint bar clamping mechanism (178) configured to clamp the restraint bar (173) in a lower position so as to restrain the plurality of tiles from movement. Additionally, the restraint bar assembly may include a restraint bar clamping release (179) configured to release the restraint bar clamping mechanism (187) so as to allow the restraint bar (173) to retract to a raised position so as to allow movement of the plurality of tiles.

The device (100) may include an adjustable tile positioning guide (180) attached to the device base (110) or to the pair of vertical supports (120) via one or more tile positioning guide supports (182). The tile positioning guide (180) may aid in the positioning of the plurality of tiles relative to the cutting axis (122). As a non-limiting example, the tile positioning guide (180) may be positioned at a measured distance from the cutting axis (122) such that when an edge of each of the plurality of tiles contacts the tile positioning guide (180), each of the plurality of tiles is positioned relative to the cutting axis (122) such that it may be cut to the measured distance. In some embodiments, the device (100) may include an alignment laser configured to illuminate the cutting axis (122) on the top surface (112) so as to guide alignment of the plurality of tiles relative to the cutting axis (122). The device (100) may also include a plurality of transportation wheels extending from the device base (110). Similarly, the device (100) may include a transportation handle extending from the device base (110).

As a non-limiting example of a low-dust device (100) for simultaneously cutting a plurality of tiles, the device (100) may comprise: a device base (110), having a top surface (112) for supporting the plurality of tiles; a pair of vertical supports (120), extending vertically from the top surface (112) of the device base (110) with a horizontal gap between them; a scoring guide rail (130) supported by the pair of vertical supports (120) with a vertical gap between the top surface (112) of the device base (110) and the scoring guide rail (130), wherein the scoring guide rail (130) is parallel to the top surface (112) of the device base (110); a movable scoring wheel (134) supported by the scoring guide rail (130) so that it is configured to score the plurality of tiles along a cutting axis (122); a fulcrum ridge (140), disposed on the top surface (112) of the device base (110) such that it is parallel with the cutting axis (122); a breaker bar rail (150) supported by the pair of vertical supports (120) such that it is parallel to the top surface (112) of the device base (110); and a movable breaker bar (156) supported by the breaker bar rail (150) and configured to simultaneously press down and contact the plurality of tiles along a breaker bar contact area (168) having its longest dimension parallel with the cutting axis (122). In some embodiments, the breaker bar contact area (168) may be a contact surface formed from a hard plastic, metal, or rubber, or a flexible or semi-flexible material. In preferred embodiments, the breaker bar may have a length, a width, and a height, where the length is substantially greater than the width or the height, and the length is parallel with the cutting axis. In some embodiments, a contact surface of the breaker bar may have a concave shape such that the breaker bar is configured to press down on both sides of the cutting axis.

As another non-limiting example of a low-dust device for cutting multiple tiles simultaneously, the device may comprise: a device base, having a top surface and a bottom surface; a pair of vertical supports, extending vertically from the top surface of the device base; a scoring guide rail supported by the pair of vertical supports at a gap distance from the device base, wherein the scoring guide rail is parallel to the top surface of the device base; a movable scoring wheel supported by the scoring guide rail so that it is configured to score one or more tiles along a cutting axis; a fulcrum ridge, disposed on the top surface of the device base such that it is parallel with the cutting axis; and a movable breaker bar supported by the pair of vertical supports and configured to simultaneously press down on one or more tiles along the cutting axis. In preferred embodiments, the breaker bar may have a length, a width, and a height, where the length is substantially greater than the width or the height, and where the length is parallel with the cutting axis. In some embodiments, the scoring guide rail may extend between the pair of vertical supports. In other embodiments, the device may include an adjustable tile positioning guide for positioning one or more tiles in a desired position with relation to the cutting axis.

In some embodiments, the present invention may feature a method of cutting multiple tiles simultaneously. As a non-limiting example, the method may include: providing a tile cutting device having a cutting axis, the tile cutting device comprising: a substrate having a top surface and a bottom surface; a scoring means for scoring multiple tiles along the cutting axis; a fulcrum ridge, disposed on the top surface of the substrate such that it is parallel with the cutting axis; and a movable breaker bar configured to press down on multiple tiles along the cutting axis; positioning multiple tiles on a top surface of the tile cutting device such that each tile is bisected by the cutting axis; scoring each of the tiles along the cutting axis using the scoring means, and actuating the movable breaker bar so as to simultaneously press down on the multiple tiles such that each of the tiles is snapped along the cutting axis. In some embodiments, the scoring means may include a scoring wheel. In other embodiments, the scoring means may include a scoring laser.

In one embodiment, the low-dust device (100) for simultaneously cutting a plurality of tiles may be operated manually, without the need for an electrical power supply. For example, the force required for operation of the device may be supplied via a human operator applying force to one or more handles. In other embodiments, the device (100) may be operated using a hydraulic force, or using an electric motor and a geared power transfer system. As a non-limiting example, the device (100) may include a breaker bar hydraulic system (162). The device (100) may be partially or fully automated, such that one or all of it's operation may be accomplished at the direction of an electronic signal. As a non-limiting example, a push-button may be pressed to actuate a restraint bar assembly, a scoring wheel assembly, a breaker bar assembly, or any combination thereof.

The present invention may additionally feature a low-dust scoring device (300) for scoring a concrete masonry unit (CMU). The device (300) may include one or more (e.g. a pair) of device bases (310), each having a top surface (312) for supporting a CMU and a bottom surface (316). The bottom surface (316) may have a plurality of feet. The device (300) may include a CMU support mat (314) disposed on the top surface (312) of each device base (310). In embodiments with multiple device bases (310) the device (300) may include one or more base attachment rods (320) passing through at least one of the device bases (310) so as to adjustably attach the pair of device bases (310) together. The device (300) may also include one or more base attachment fasteners (322) adjustably attached to the one or more base attachment rods (320) so as to fasten the device bases (310) at a base separation distance from each other. As a non-limiting example, the base attachment rods (320) and base attachment fasteners (322) may allow a pair of device bases (310) to be attached with zero gap between them, at a base separation distance of 8 inches from each other, or at any base separation distance between 0 and 8 inches from each other. In some embodiments, the base attachment rods (320) and base attachment fasteners (322) may be designed so as to lock the device bases (310) into position only at predetermined base separation distances from each other. As a non-limiting example, the base attachment rods (320) and base attachment fasteners (322) may be designed so as to lock the device bases (310) into position at predetermined base separation distances of 1, 2, 3, 4, 5, or 6 inches from each other. As a non-limiting example, the base attachment fasteners (322) may be cam lock type fasteners.

The device (300) may include a pair of vertical supports (330), each extending vertically from the top surface (312) of a device base (310) with a horizontal gap between the vertical supports (330). The position of each vertical support (330) may be fixed relative to its device base (310), or may be adjustable along its device base (310). In some embodiments, one vertical support (330) may be fixed relative to its device base (310) and the other may be adjustable along the same device base (310). In one embodiment, the vertical supports (330) may be removably attached to the device bases (310), such that they may be easily detached from the device bases (310) (e.g. for storage, transportation, or cleaning).

The device (300) may include one or more horizontal reinforcement members extending between the pair of vertical supports (330) with a vertical gap between the top surfaces (312) of the device bases (310) and the horizontal reinforcement members. The vertical gap and the horizontal gap may form a scoring chamber configured to hold the CMU. In embodiments without horizontal reinforcement members, the horizontal gap may form a scoring chamber with an open top. The horizontal gap may vary with the position of the device bases (310) or vertical supports (330) such that the scoring chamber may be adjusted to fit CMU's with a variety of sizes.

In some embodiments, the horizontal gap may be equal with the width of the CMU, such that each of the pair of vertical supports (330) contacts a side of the CMU. In other embodiments, the horizontal gap may be greater than the width of the CMU, such that the CMU may be more easily positioned in the scoring chamber. In selected embodiments, the device (300) may include one or more deformable shock absorbers extending from one or both of the vertical supports (330) into the scoring chamber, so to contact one or more CMUs within the scoring chamber. These deformable shock absorbers may be fixed in position relative to the vertical supports (330), or may be configured to retract so as to allow for positioning of the CMU and then extend to hold the CMU in position.

In preferred embodiments, the device (300) may include a pair of scoring chisels (340), each having a scoring blade (342). The pair of scoring chisels (340) are supported by the pair of vertical supports such that the scoring blades are aligned and opposed on either side of the scoring chamber. The device (300) may include an impact driving system configured to actuate the pair of scoring chisels to dynamically force the pair of scoring chisels towards each other so as to score opposing sides of a CMU positioned within the scoring chamber. In preferred embodiments, the scoring chisels (340) are aligned so as to score the CMU about a single scoring plane that bisects a length of the CMU. The impact driving system may be configured to actuate the pair of scoring chisels simultaneously or consecutively. In one embodiment, the impact driving system may include an impact platform (350) mechanically coupled to one or both scoring chisels (340) such that striking the impact platform (350) drives one or both scoring chisels (340) into the CMU. Each of the scoring chisels (340) may be mechanically coupled to its own impact platform (350), or a single impact platform (350) may be mechanically coupled to both scoring chisels (340). In an alternative embodiment, the impact driving system may comprise one or more impact driving springs or movable impact driving counterweights. The impact driving system may be primed for action via an impact driving system primer (357) such as a lever, crank, or hoist, and actuated by triggering one or more impact driving system releases. Separate impact driving system releases may allow for consecutive actuation of the two scoring chisels (340).

In some embodiments, the impact driving system may be powered by the application of force from a human operator. In other embodiments, the impact driving system may be powered by a mechanical or electromechanical force. As a non-limiting example, the device (300) may be configured for attachment to an electric drill, such that rotation of a drill attachment primes the impact driving system for action or even automatically and repetitively actuates the impact driving system. In some embodiments, operation of the device (300) may be partially or totally automated.

The device (300) may include an adjustable CMU positioning guide (370) attached to one or both of the device bases (310) via one or more CMU positioning supports (372). The CMU positioning guide (370) may guide the positioning of the CMU relative to the scoring plane so as to set the length of the CMU after it is split along the score marks caused by the scoring chisels (340). The device (300) may include an alignment laser attached to one of the vertical supports (330) and configured to illuminate a CMU in the scoring chamber to guide positioning of the CMU relative to the scoring plane. In some embodiments, the device (300) may include a plurality of transportation wheels extending from the device bases (310). Additionally, in some embodiments, the device (300) may include a transportation handle extending from the device base.

As a non-limiting example of a low-dust concrete masonry unit (CMU) scoring device, the device may comprise: a device base having a top surface and a bottom surface; a pair of vertical supports extending vertically from the top surface of the device base with a gap between the vertical supports; a pair of scoring chisels, each having a scoring blade, wherein the pair of scoring chisels are supported by the pair of vertical supports such that the scoring blades are aligned and opposed on either side of the gap; and an impact driving system configured to actuate the pair of scoring chisels to dynamically force the pair of scoring chisels towards each other so as to score opposing sides of a CMU positioned within the gap. In some embodiments, both chisels may be actuated simultaneously. In other embodiments, both chisels may be actuated independently. In selected embodiments, the scoring chisels may have a height corresponding to a height of multiple stacked blocks, such that the device is configured to simultaneously score multiple stacked CMUs.

In some embodiments, the present invention may feature a method of splitting a concrete masonry unit (CMU). As a non-limiting example, the method may include, providing a CMU scoring device; positioning the CMU in the CMU scoring device; actuating the CMU scoring device so as to score two opposing faces of the CMU along a scoring plane that bisects the CMU; removing the CMU from the CMU scoring device; and striking the CMU so as to split the CMU along the scoring plane.

The following is a non-limiting list of enumerated embodiments:

Enumerated embodiment 1: A low-dust device (100) for simultaneously cutting a plurality of tiles, the device (100) comprising:
 a) a device base (110), having a top surface (112) for supporting the plurality of tiles and a bottom surface (116) having a plurality of feet;
 b) one or more tile support mats (114) disposed on the top surface (112) of the device base (110);

c) a pair of vertical supports (120), extending vertically from the top surface (112) of the device base (110) with a horizontal gap between them;
d) a scoring guide rail (130) supported by the pair of vertical supports (120) with a vertical gap between the top surface (112) of the device base (110) and the scoring guide rail (130) such that the vertical gap and the horizontal gap form a tile slot (128), wherein the scoring guide rail (130) is parallel to the top surface (112) of the device base (110);
e) a movable scoring wheel assembly (132) comprising:
   i) a scoring bearing (133), disposed around the scoring guide rail (130) such that it may move along the scoring guide rail (130);
   ii) a scoring wheel support (134), extending from the scoring bearing (133);
   iii) a scoring wheel (136) attached to the scoring wheel support (134) such that it is configured to score the plurality of tiles along a cutting axis (122) as the scoring bearing (133) is moved along the scoring guide rail (130);
   iv) a scoring tension spring configured to retract the scoring wheel (136) when not in use; and
   v) a scoring handle (138) attached to the scoring wheel support (134) so as to allow for actuation of the scoring wheel assembly (132);
f) a fulcrum ridge (140), disposed on the top surface (112) of the device base (110) such that it is parallel with the cutting axis (122);
g) a breaker bar rail (150) supported by the pair of vertical supports (120) such that it is parallel to the top surface (122) of the device base (110);
h) a breaker bar assembly (152) comprising:
   i) one or more breaker bar bearings (153) disposed around the breaker bar rail (150) so as to rotate around the breaker bar rail (150);
   ii) one or more breaker bar supports (154) extending from the one or more breaker bar bearings (153), the breaker bar supports (154) additionally comprising one or more breaker bar hinges (155);
   iii) a breaker bar (156) attached the one or more breaker bar supports (154) such that it is parallel with the cutting axis (122), the breaker bar (156) having a breaker bar contact surface (164) configured to simultaneously contact the plurality of tiles along a breaker bar contact area (168) having its longest dimension parallel with the cutting axis (122);
   iv) a breaker bar handle (158) attached to the breaker bar (156) so as to allow for actuation of the breaker bar assembly (152);
   v) a breaker bar impact platform disposed on the breaker bar (156) so as to allow for forceful actuation of the breaker bar assembly (152) via impact to the breaker bar impact platform; and
   vi) a plurality of breaker bar alignment tabs (166) extending from opposite ends of the breaker bar (156) so as to index with breaker bar alignment slots (167) in the pair of vertical supports (120), the tabs (166) and slots (167) configured to guide precision actuation of the breaker bar assembly (152);
i) a restraint bar assembly comprising:
   i) a pair of restraint bar hinges attached to the pair of vertical supports (120);
   ii) a pair of restraint bar supports (172) extending from the pair of restraint bar hinges;
   iii) a restraint bar (173) attached to the pair of restraint bar supports (172) such that it is parallel with the cutting axis (122), the restraint bar (173) having a restraint bar contact surface (176) configured to simultaneously contact the plurality of tiles along a restraint bar contact area (177) having its longest dimension parallel with the cutting axis (122);
   iv) a restraint bar handle (174) attached to the restraint bar (173) so as to allow for actuation of the restraint bar assembly (152);
   v) a restraint bar clamping mechanism (178) configured to clamp the restraint bar (173) in a lower position so as to restrain the plurality of tiles from movement; and
   vi) a restraint bar clamping release (179) configured to release the restraint bar clamping mechanism (187) so as to allow the restraint bar (173) to retract to a raised position so as to allow movement of the plurality of tiles;
j) an adjustable tile positioning guide (180) attached to the device base (110) via one or more tile positioning guide supports (182) so as to aid in the positioning of the plurality of tiles relative to the cutting axis (122);
k) an alignment laser configured to illuminate the cutting axis (122) on the top surface (112) so as to guide alignment of the plurality of tiles;
l) a plurality of transportation wheels extending from the device base (110); and
m) a transportation handle extending from the device base (110).

Enumerated embodiment 2: A low-dust device (100) for simultaneously cutting a plurality of tiles, the device (100) comprising:
a) a device base (110), having a top surface (112) for supporting the plurality of tiles;
b) a pair of vertical supports (120), extending vertically from the top surface (112) of the device base (110) with a horizontal gap between them;
c) a scoring guide rail (130) supported by the pair of vertical supports (120) with a vertical gap between the top surface (112) of the device base (110) and the scoring guide rail (130), wherein the scoring guide rail (130) is parallel to the top surface (112) of the device base (110);
d) a movable scoring wheel (134) supported by the scoring guide rail (130) so that it is configured to score the plurality of tiles along a cutting axis (122);
e) a fulcrum ridge (140), disposed on the top surface (112) of the device base (110) such that it is parallel with the cutting axis (122);
f) a breaker bar rail (150) supported by the pair of vertical supports (120) such that it is parallel to the top surface (112) of the device base (110); and
g) a movable breaker bar (156) supported by the breaker bar rail (150) and configured to simultaneously press down and contact the plurality of tiles along a breaker bar contact area (168) having its longest dimension parallel with the cutting axis (122).

Enumerated embodiment 3: The device of enumerated embodiment 2, wherein the breaker bar has a length, a width, and a height, wherein the length is substantially greater than the width or the height, and wherein the length is parallel with the cutting axis.

Enumerated embodiment 4: The device of enumerated embodiment 2, wherein a contact surface of the breaker bar has a concave shape such that the breaker bar is configured to press down on both sides of the cutting axis.

Enumerated embodiment 5: A low-dust device for cutting multiple tiles simultaneously, the device comprising:

a) a device base, having a top surface and a bottom surface;
b) a pair of vertical supports, extending vertically from the top surface of the device base;
c) a scoring guide rail supported by the pair of vertical supports at a gap distance from the device base, wherein the scoring guide rail is parallel to the top surface of the device base;
d) a movable scoring wheel supported by the scoring guide rail so that it is configured to score one or more tiles along a cutting axis;
e) a fulcrum ridge, disposed on the top surface of the device base such that it is parallel with the cutting axis; and
f) a movable breaker bar supported by the pair of vertical supports and configured to simultaneously press down on one or more tiles along the cutting axis, the breaker bar having a length, a width, and a height, wherein the length is substantially greater than the width or the height, and wherein the length is parallel with the cutting axis.

Enumerated embodiment 6: The device of enumerated embodiment 5, wherein the scoring guide rail extends between the pair of vertical supports.

Enumerated embodiment 7: The device of enumerated embodiment 5, additionally comprising an adjustable tile positioning guide for positioning one or more tiles in a desired position with relation to the cutting axis.

Enumerated embodiment 8: A method of cutting multiple tiles simultaneously, the method comprising:
a) providing a tile cutting device having a cutting axis, the tile cutting device comprising:
  i) a substrate having a top surface and a bottom surface;
  ii) a scoring means for scoring multiple tiles along the cutting axis;
  iii) a fulcrum ridge, disposed on the top surface of the substrate such that it is parallel with the cutting axis; and
  iv) a movable breaker bar configured to press down on multiple tiles along the cutting axis;
b) positioning multiple tiles on a top surface of the tile cutting device such that each tile is bisected by the cutting axis;
c) scoring each of the tiles along the cutting axis using the scoring means, and
d) actuating the movable breaker bar so as to simultaneously press down on the multiple tiles such that each of the tiles is snapped along the cutting axis.

Enumerated embodiment 9: The method of enumerated embodiment 8, wherein the scoring means comprises a scoring wheel.

Enumerated embodiment 10: The method of enumerated embodiment 8, wherein the scoring means comprises a scoring laser.

Enumerated embodiment 11: A low-dust scoring device (300) for scoring a concrete masonry unit (CMU), the device (300) comprising:
a) a pair of device bases (310), each having a top surface (312) for supporting a CMU and a bottom surface (316) having a plurality of feet;
b) a CMU support mat (314) disposed on the top surface (312) of each device base (310);
c) one or more base attachment rods (320) passing through at least one of the device bases (310) so as to adjustably attach the pair of device bases (310) together;
d) one or more base attachment fasteners (322) adjustably attached to the one or more base attachment rods (320) so as to fasten the device bases (310) at a base separation distance from each other;
e) a pair of vertical supports (330) extending vertically from the top surface (312) of the device base (310) with a horizontal gap between the vertical supports (330);
f) one or more horizontal reinforcement members extending between the pair of vertical supports (330) with a vertical gap between the top surfaces (312) of the device bases (310) and the horizontal reinforcement members such that the vertical gap and the horizontal gap form a scoring chamber configured to hold the CMU;
g) one or more deformable shock absorbers extending from one or both of the vertical supports (330) into the scoring chamber, the shock absorbers configured to contact the CMU;
h) a pair of scoring chisels (340), each having a scoring blade (342), wherein the pair of scoring chisels (340) are supported by the pair of vertical supports such that the scoring blades are aligned and opposed on either side of the scoring chamber;
i) an impact driving system configured to actuate the pair of scoring chisels (340) to dynamically force the pair of scoring chisels (340) towards each other so as to score opposing sides of a CMU positioned within the scoring chamber;
j) an adjustable CMU positioning guide (370) attached to one or both of the device bases (310) via one or more CMU positioning supports (372) so as to guide the positioning of the CMU relative to the scoring plane;
k) an alignment laser attached to one of the vertical supports (330) and configured to illuminate a CMU in the scoring chamber to guide positioning of the CMU relative to the scoring plane;
l) a plurality of transportation wheels extending from the device bases (310); and
m) a transportation handle extending from the device base.

Enumerated embodiment 12: A low-dust concrete masonry unit (CMU) scoring device, the device comprising:
a) a device base having a top surface and a bottom surface;
b) a pair of vertical supports extending vertically from the top surface of the device base with a gap between the vertical supports;
c) a pair of scoring chisels, each having a scoring blade, wherein the pair of scoring chisels are supported by the pair of vertical supports such that the scoring blades are aligned and opposed on either side of the gap;
d) an impact driving system configured to actuate the pair of scoring chisels to dynamically force the pair of scoring chisels towards each other so as to score opposing sides of a CMU positioned within the gap.

Enumerated embodiment 13: The device of enumerated embodiment 12, wherein both chisels may be actuated simultaneously.

Enumerated embodiment 14: The device of enumerated embodiment 12, wherein both chisels may be actuated independently.

Enumerated embodiment 15: The device of enumerated embodiment 12, wherein the scoring chisels have a height corresponding to a height of multiple stacked blocks, such that the device is configured to simultaneously score multiple stacked CMUs.

Enumerated embodiment 16: A method of splitting a concrete masonry unit (CMU), the method comprising:
a) providing a CMU scoring device;
b) positioning the CMU in the CMU scoring device;
c) actuating the CMU scoring device so as to score two opposing faces of the CMU along a scoring plane that bisects the CMU;
d) removing the CMU from the CMU scoring device; and
e) striking the CMU so as to split the CMU along the scoring plane.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A low-dust device for simultaneously cutting a plurality of tiles, the device comprising:
a device base, having a top surface for supporting the plurality of tiles and a bottom surface having a plurality of feet;
a pair of vertical supports, extending vertically from the top surface of the device base with a horizontal gap between the vertical supports;
a scoring guide rail supported by the pair of vertical supports with a vertical gap between the top surface of the device base and the scoring guide rail such that the vertical gap and the horizontal gap form a tile slot, wherein the scoring guide rail is parallel to the top surface of the device base;
a movable scoring wheel assembly comprising:
a scoring bearing, disposed around the scoring guide rail such that the scoring bearing may move along the scoring guide rail;
a scoring wheel support, extending from the scoring bearing;
a scoring wheel attached to the scoring wheel support such that the scoring wheel is configured to score the plurality of tiles along a cutting axis as the scoring bearing is moved along the scoring guide rail;
a scoring tension spring configured to retract the scoring wheel when not in use; and
a scoring handle attached to the scoring wheel support so as to allow for actuation of the scoring wheel assembly;
a fulcrum ridge, disposed on the top surface of the device base such that the fulcrum ridge is parallel with the cutting axis;
a breaker bar rail supported by the pair of vertical supports such that the breaker bar rail is parallel to the top surface of the device base;
a breaker bar assembly comprising:
one or more breaker bar bearings disposed around the breaker bar rail so as to rotate around the breaker bar rail;
one or more breaker bar supports extending from the one or more breaker bar bearings, the breaker bar supports additionally comprising one or more breaker bar hinges;
a breaker bar attached the one or more breaker bar supports such that the breaker bar is parallel with the cutting axis, the breaker bar having a breaker bar contact surface configured to simultaneously contact the plurality of tiles along a breaker bar contact area having the longest dimension of the breaker bar parallel with the cutting axis;
a breaker bar handle attached to the breaker bar so as to allow for actuation of the breaker bar assembly; and
a plurality of breaker bar alignment tabs extending from opposite ends of the breaker bar so as to index with breaker bar alignment slots in the pair of vertical supports, the plurality of breaker bar alignment tabs and the breaker bar alignment slots are configured to guide precision actuation of the breaker bar assembly.

2. The device of claim 1, additionally comprising a restraint bar assembly, configured to restrain the plurality of tiles from movement.

3. The device of claim 2, wherein the restraint bar assembly comprises:
a pair of restraint bar hinges attached to the pair of vertical supports;
a pair of restraint bar supports extending from the pair of restraint bar hinges;
a restraint bar attached to the pair of restraint bar supports such that the restraint bar is parallel with the cutting axis, the restraint bar having a restraint bar contact surface configured to simultaneously contact the plurality of tiles along a restraint bar contact area having its longest dimension parallel with the cutting axis;
a restraint bar handle attached to the restraint bar so as to allow for actuation of the restraint bar assembly;
a restraint bar clamping mechanism configured to clamp the restraint bar in a lower position so as to restrain the plurality of tiles from movement; and
a restraint bar clamping release configured to release the restraint bar clamping mechanism so as to allow the restraint bar to retract to a raised position so as to allow movement of the plurality of tiles.

4. The device of claim 1, additionally comprising one or more tile support mats disposed on the top surface of the device base.

5. The device of claim 1, wherein the scoring guide rail is a portion of the breaker bar.

6. The device of claim 1, additionally comprising an adjustable tile positioning guide attached to the device base via one or more tile positioning guide supports so as to aid in the positioning of the plurality of tiles relative to the cutting axis.

7. The device of claim 1, additionally comprising an alignment laser configured to illuminate the cutting axis on the top surface so as to guide alignment of the plurality of tiles.

8. The device of claim 1, additionally comprising a plurality of transportation wheels extending from the device base; and a transportation handle extending from the device base.

9. The device of claim 1, wherein the breaker bar assembly additionally comprises a breaker bar impact platform disposed on the breaker bar so as to allow for forceful actuation of the breaker bar assembly via impact to the breaker bar impact platform.

10. A low-dust device for cutting multiple tiles simultaneously, the device comprising:
- a device base, having a top surface and a bottom surface;
- a pair of vertical supports, extending vertically from the top surface of the device base;
- a scoring guide rail supported by the pair of vertical supports at a gap distance from the device base, wherein the scoring guide rail is parallel to the top surface of the device base;
- a movable scoring wheel supported by the scoring guide rail so that the movable scoring wheel is configured to score one or more tiles along a cutting axis;
- a fulcrum ridge, disposed on the top surface of the device base such that the fulcrum ridge is parallel with the cutting axis; and
- a movable breaker bar supported by the pair of vertical supports and configured to simultaneously press down on one or more tiles along the cutting axis, the breaker bar having a length, a width, and a height, wherein the length is substantially greater than the width or the height, and wherein the length is parallel with the cutting axis, wherein the pair of vertical supports comprise a means for indexing with opposite ends of the breaker bar to guide precision actuation of the breaker bar.

11. The device of claim 10, wherein the means for indexing with opposite ends of the breaker bar comprises a plurality of alignment slots indexed with a plurality of breaker bar alignment tabs extending from opposite ends of the breaker bar such that the plurality of breaker bar alignment tabs and plurality of alignment slots are configured to guide precision actuation of the breaker bar.

12. The device of claim 10, additionally comprising an adjustable tile positioning guide for positioning one or more tiles in a desired position with relation to the cutting axis.

13. The device of claim 10, wherein a contact surface of the breaker bar has a concave shape such that the breaker bar is configured to press down on both sides of the cutting axis.

14. The device of claim 10, wherein the scoring guide rail is a portion of the movable breaker bar.

15. The device of claim 14, wherein the breaker bar comprises a scoring guide channel passing through the breaker bar, thereby forming the scoring guide rail within the breaker bar.

16. The device of claim 15, wherein the breaker bar additionally comprises one or more scoring guide grooves within interior sides of the breaker bar surrounding the scoring guide channel; and wherein the one or more scoring guide grooves are configured to support and guide one or more scoring bearings.

17. The device of claim 10, additionally comprising one or more breaker cams configured to actuate the breaker bar as a breaker bar handle is pressed.

18. A method of cutting multiple tiles simultaneously, the method comprising:
- providing a tile cutting device having a cutting axis, the tile cutting device comprising:
  - a substrate having a top surface and a bottom surface;
  - a scoring means for scoring multiple tiles along the cutting axis;
  - a fulcrum ridge, disposed on the top surface of the substrate such that the fulcrum ridge is parallel with the cutting axis; and
  - a movable breaker bar having a breaker bar contact surface extending from a first vertical support to a second vertical support and configured to remain perfectly parallel with the cutting axis during precision actuation, thus configured to press down on multiple tiles along the cutting axis;
- positioning multiple tiles on a top surface of the tile cutting device such that each tile is bisected by the cutting axis;
- scoring each of the tiles along the cutting axis using the scoring means, and
- actuating the movable breaker bar so as to simultaneously press down on the multiple tiles such that each of the tiles is snapped along the cutting axis.

19. The method of claim 18, wherein the scoring means comprises a scoring wheel.

20. The method of claim 18, wherein the scoring means comprises a scoring laser.

* * * * *